(12) United States Patent
Kheterpal et al.

(10) Patent No.: US 12,063,291 B2
(45) Date of Patent: Aug. 13, 2024

(54) DEVICES AND CIRCUITRY FOR COMPUTING HASH VALUES

(71) Applicant: Coinbase, Inc., Oakland, CA (US)

(72) Inventors: Veerbhan Kheterpal, San Francisco, CA (US); Daniel Firu, San Francisco, CA (US); Nigel Drego, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 555 days.

(21) Appl. No.: 17/017,027

(22) Filed: Sep. 10, 2020

(65) Prior Publication Data

US 2020/0412544 A1 Dec. 31, 2020

Related U.S. Application Data

(63) Continuation of application No. 14/738,659, filed on Jun. 12, 2015, now abandoned.

(60) Provisional application No. 62/065,551, filed on Oct. 17, 2014.

(51) Int. Cl.
| | |
|---|---|
| *H04L 9/06* | (2006.01) |
| *G06F 9/30* | (2018.01) |
| *H04L 9/00* | (2022.01) |
| *H04L 9/32* | (2006.01) |

(52) U.S. Cl.
CPC ........ *H04L 9/0643* (2013.01); *G06F 9/30098* (2013.01); *H04L 9/3242* (2013.01); *H04L 9/50* (2022.05); *H04L 2209/125* (2013.01); *H04L 2209/20* (2013.01); *H04L 2209/24* (2013.01); *H04L 2209/30* (2013.01); *H04L 2209/56* (2013.01)

(58) Field of Classification Search
CPC . G06F 9/30098; H04L 9/3242; H04L 9/0643; H04L 9/50; H04L 2209/125; H04L 2209/20; H04L 2209/24; H04L 2209/30; H04L 2209/56
USPC .......................................................... 705/50
See application file for complete search history.

(56) References Cited

U.S. PATENT DOCUMENTS

| | | | |
|---|---|---|---|
| 6,819,671 B1 | 11/2004 | Chen et al. | |
| 6,829,355 B2 | 12/2004 | Lilly | |
| 7,142,669 B2 | 11/2006 | Dworkin et al. | |
| 7,584,441 B2 | 9/2009 | Gidon et al. | |
| 7,757,187 B2 | 7/2010 | Kheterpal et al. | |
| 8,020,127 B1 * | 9/2011 | Chan ...................... | G06F 30/30 |
| | | | 716/108 |
| 8,174,329 B2 | 5/2012 | Goodnow et al. | |

(Continued)

FOREIGN PATENT DOCUMENTS

| | | |
|---|---|---|
| TW | 338263 U | 8/1998 |
| TW | 453064 B | 9/2001 |

(Continued)

OTHER PUBLICATIONS

Rahul P. Naik (Optimizing the SHA256 Hashing Algorithm for Faster and More Efficient Bitcoin Mining, Sep. 2, 2013 (Year: 2013).*

(Continued)

*Primary Examiner* — Mohammad A. Nilforoush
*Assistant Examiner* — Wodajo Getachew
(74) *Attorney, Agent, or Firm* — Foley & Lardner LLP

(57) ABSTRACT

Devices and circuitry for computing hash values.

20 Claims, 17 Drawing Sheets

(56) References Cited

U.S. PATENT DOCUMENTS

| | | | |
|---|---|---|---|
| 8,873,750 B2* | 10/2014 | Greiner | G06F 7/582 380/46 |
| 2002/0066014 A1 | 5/2002 | Dworkin et al. | |
| 2002/0122554 A1* | 9/2002 | Lilly | H04L 9/0643 380/28 |
| 2008/0095375 A1 | 4/2008 | Tateoka et al. | |
| 2008/0104552 A1 | 5/2008 | Yamada | |
| 2009/0177894 A1 | 7/2009 | Orsini et al. | |
| 2010/0031052 A1* | 2/2010 | Kim | H04L 63/164 713/181 |
| 2010/0086127 A1 | 4/2010 | Grinchuk et al. | |
| 2010/0318947 A1 | 12/2010 | Motiani et al. | |
| 2011/0050281 A1 | 3/2011 | Moe et al. | |
| 2011/0176673 A1* | 7/2011 | Yamamoto | G09C 1/00 380/28 |
| 2012/0257742 A1* | 10/2012 | Ebeid | H04L 9/0643 380/28 |
| 2014/0281550 A1 | 9/2014 | Resch | |
| 2016/0086175 A1* | 3/2016 | Finlow-Bates | G06Q 20/4015 705/77 |
| 2016/0253907 A1 | 9/2016 | Taveira | |
| 2017/0228953 A1 | 8/2017 | Lupovici | |
| 2017/0293769 A1 | 10/2017 | Quinlan et al. | |
| 2021/0019971 A1 | 1/2021 | Martin et al. | |

FOREIGN PATENT DOCUMENTS

| | | |
|---|---|---|
| TW | 200405184 A | 4/2004 |
| TW | 200604870 A | 2/2006 |
| TW | 201038036 A | 10/2010 |
| TW | 201342211 A | 10/2013 |
| WO | 2006/047694 A1 | 5/2006 |

OTHER PUBLICATIONS

"Block," Bitcoin Wiki, Mar. 2, 2014 [Retrieved on Apr. 14, 2014]. Retrieved from the Internet <URL:https://en.bitcoin.it/wiki/Block>.

"Mining," Bitcoin Wiki, Apr. 1, 2014 [Retrieved on Apr. 14, 2014]. Retrieved from the Internet <URL:https://en.bitcoin.it/wiki/Mining>.

Berke, et al., Berke et al. "Bitcoin Demystified: A Hacker's Perspective", Huff Post Code, Nov. 25, 2013.

Naik, Rahul P, Naik Rahul P., Optimizing the SHA256 Hashing Algorithm for Faster and More Efficient Bitcoin Mining, Sep. 2, 2013, University College London (Year: 2013).

Nakamoto, Satoshi, "Bitcoin: A Peer-to-Peer Electronic Cash System", Oct. 31, 2008.

Sengupta, Anirban, et al., "A high level synthesis design flow with a novel approach for efficient design space exploration in case of multi-parametric optimization objective", Microelectronics Reliability 50 (2010) 424-437.

Sengupta, Anirban, et al., "Integrated Scheduling, Allocation and Binding in High Level Synthesis using Multi Structure Genetic Algorithm based Design Space Exploration", 12th Int'l Symposium on Quality Electronic Design, IEEE, 2011.

Shi, Zhijie, et al., "Hardware Implementation of Hash Functions", Springer, Introduction to Hardware Security and Trust, Chapter 2, 2012, VIII.

Tucker, et al., "Interactive Demonstration: This Is How You Mine Some Bitcoin," Bloomberg Businessweek, Jan. 13, 2014 [Retrieved on Apr. 14, 2014]. Retrieved from the Internet.

White, Ron, "How Computers Work", Oct. 15, 2003, Paul Boger, Illustrated by Timothy Edward Downs, 7th Edition (Year: 2003).

Feb. 28, 2022—U.S. Office Action—U.S. Appl. No. 17/044,121.

Nov. 19, 2021—(EP) European Extended Search Report—App. No. 19787749.1.

* cited by examiner

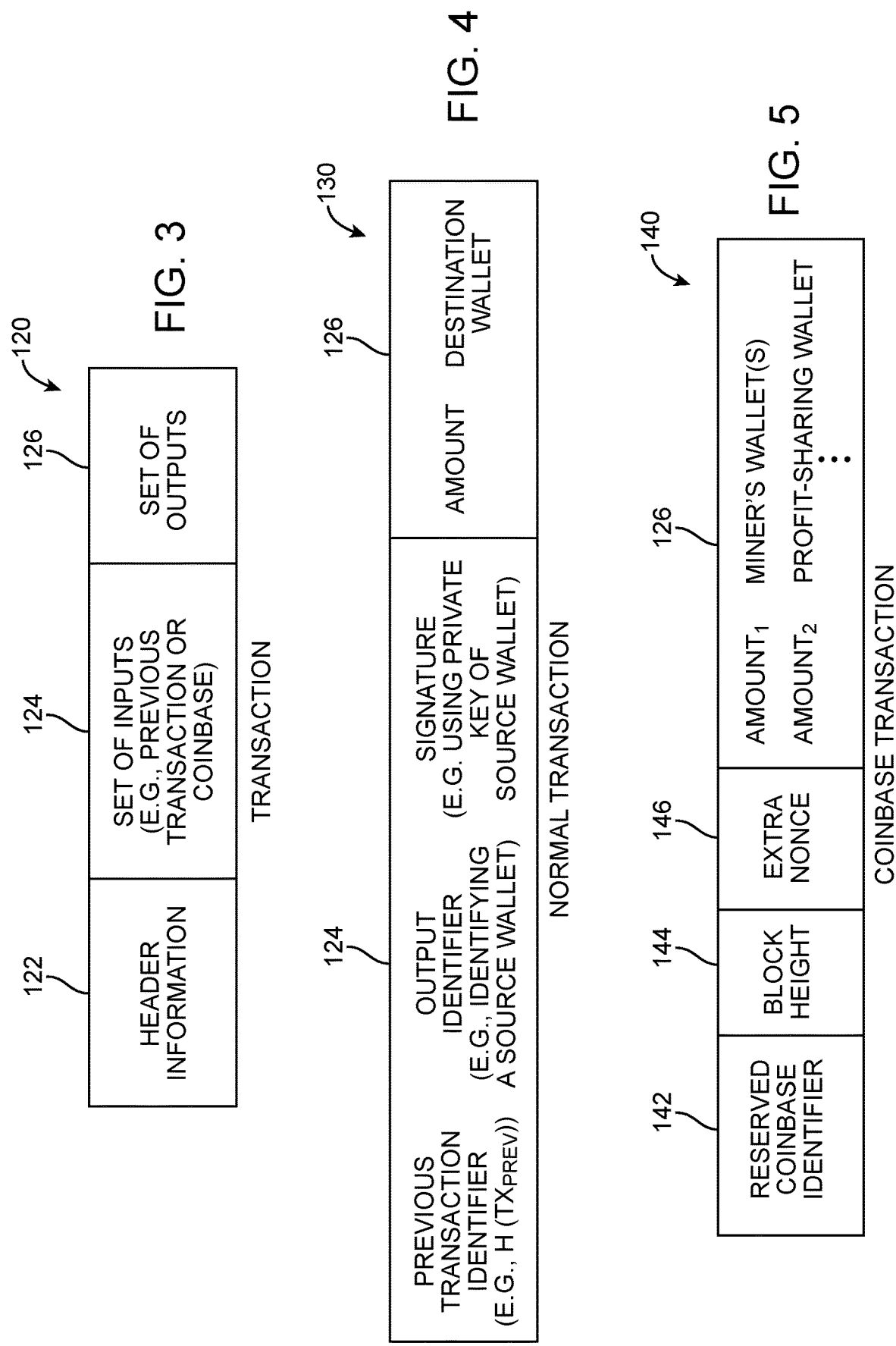

Ch (E,F,G) = (E^F) ⊕ (¬ E^G)

Ma (A,B,C) = (A^B) ⊕ (A^C) ⊕ (B^C)

Σ0 (A) = (A>>>2) ⊕ (A>>>13) ⊕ (A>>>22)

Σ1 (E) = (E>>>6) ⊕ (E>>>11) ⊕ (E>>>25)

DEVICES AND CIRCUITRY FOR COMPUTING HASH VALUES

CROSS-REFERENCE TO RELATED APPLICATIONS

This application is a continuation of prior U.S. application Ser. No. 14/738,659, filed 12 Jun. 2015, which claims the benefit of U.S. Provisional Application No. 62/065,551, filed 17 Oct. 2014, both of which are incorporated in their entirety by this reference.

BACKGROUND

This relates to circuitry for performing cryptographic operations, and more particularly, to circuitry for performing cryptographic hashing operations for mining digital currencies.

Digital currencies serve as a digital medium of exchange in which the digital currencies may be transferred in exchange for goods and services. Cryptocurrencies are examples of digital currencies in which cryptography governs the creation and exchange of value. An example of a crypto-currency is the bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network. The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Verified transactions and newly created bitcoins are recorded in the public ledger. The public ledger serves as an official history of transactions. The amount of cryptocurrency owned by any entity may be determined from the public ledger.

Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). Searching for solutions to the cryptographic puzzle involve performing cryptographic hashing functions and other cryptographic operations that are often computationally taxing. The difficulty of the cryptographic puzzle has led to the use of dedicated circuitry designed specifically for Bitcoin mining. Such dedicated circuitry can be expensive to design, purchase, and operate.

It may therefore be desirable to provide improved systems and methods for performing cryptographic operations such as cryptographic hashing functions.

SUMMARY OF THE INVENTION

Cryptographic hashing circuitry such as dedicated mining circuitry that may be used to mine digital currency by completing a function according to the protocol that governs the digital currency may be formed on an integrated circuit in an electronic device.

The hashing circuitry may include sequential rounds of register and logic circuitry that perform rounds of operations of a cryptographic protocol such as the Secure Hash Algorithm 256 (SHA-256) cryptographic algorithm. The register circuitry may include registers that each store 32-bit hash values. The register circuitry may include, for example, a first register that stores a first hash value, logic circuitry that generates a second hash value based on at least the stored first hash value, and a second register that stores the second hash value. The second register may output the stored second hash value as part of a final hash value output from the cryptographic hashing circuitry, whereas the first register directly outputs the stored first hash value as part of the final hash value output from the cryptographic hashing circuitry (e.g., the first hash value may be different from the second hash value).

If desired, the hashing circuitry may include a third register that stores a third hash value and a fourth register that stores a fourth hash value. The logic circuitry may generate the first hash value based on at least the stored third hash value. The third register may be configured to directly output the stored third hash value as a part of the final hash value output from the cryptographic hashing circuitry. The logic circuitry may generate the third hash value based on at least the stored fourth hash value. The fourth register may directly output the stored fourth hash value as part of the final hash value output from the cryptographic hashing circuitry.

If desired, the hashing circuitry may include a third register that stores a third hash value and a fourth register that stores a fourth hash value. The logic circuitry may generate the fourth hash value based on at least the stored third hash value and may generate the second hash value based on at least the stored first and third hash values. The third register may be configured to directly output the stored third hash value as part of the final hash value output from the cryptographic hashing circuitry, whereas the fourth register may be configured to output the stored fourth hash value as part of the final hash value. If desired, the hashing circuitry may include a fifth register that stores a fifth hash value and a sixth register that stores a sixth hash value. The fifth register may be configured to directly output the fifth hash value as part of the final hash value output from the cryptographic hashing circuitry. The logic circuitry may be configured to generate the third hash value based at least on the stored sixth hash value and may generate the first hash value based on at least the stored fifth and sixth hash values. The sixth register may be configured to directly output the sixth hash value as part of the final hash value output from the cryptographic hashing circuitry. In this way, the final hash output value may include hash values stored at previous rounds of the cryptographic hashing circuitry and the hashing circuitry may be formed with only two registers per round, thereby reducing chip area consumption by the hashing circuitry.

The hashing circuitry may perform sequential rounds of the SHA-256 cryptographic hashing algorithm based on an initial hash value and multiple message words received from message scheduling circuitry. The message scheduling circuitry may include a message register that is configured to store the message words. Control circuitry may selectively route the message words from the message register to the hashing circuitry (e.g., by reading a subset of the message words from the message register using read pointers, generating a new message word based on the read subset message words, and is writing the new message word to the message register using a write pointer). The control circuitry may increment the read pointers and the write pointer after reading the subset of the message words from the message register and prior to writing the new message word to the message register.

If desired, the message scheduling circuitry may include an additional message register that is configured to store additional message words. The control circuitry may selectively route the additional message words from the additional message register to the hashing circuitry. The hashing circuitry may include at least one pipeline register that partitions the hashing circuitry into at least first and second groups of hashing circuits. The first group of hashing circuits may perform a first subset of the plurality of sequential rounds of SHA-256 based on the message words, whereas the second group of hashing circuits may perform a second subset of the plurality of sequential rounds of SHA-256 based on the additional message words and an output of the pipeline register. The message register may receive and store a message and the control circuitry may selectively route portions of the stored message as the message words from the message register to the hashing circuitry.

If desired, the message registers may be formed as one or more arrays of memory elements. The arrays of memory elements may each store messages on corresponding columns, whereas each row corresponds to a word of that message. The control circuitry may control the array of memory elements to provide desired message words to the hashing circuitry using row and column pointers.

Further features of the invention, its nature and various advantages will be more apparent from the accompanying drawings and the following detailed description of the preferred embodiments.

BRIEF DESCRIPTION OF THE FIGURES

FIG. 3 is an illustrative transaction of digital currency that may be verified with mining circuitry in accordance with an embodiment of the present invention.

FIG. 4 is an illustrative transaction of digital currency between source and destination wallets that may be verified using cryptographic hashing circuitry running on mining circuitry in accordance with an embodiment of the present invention.

FIG. 5 is an illustrative coinbase transaction in which a portion of a reward amount is assigned to one or more different wallets in accordance with an embodiment of the present invention.

DETAILED DESCRIPTION

The present invention relates to circuitry for performing cryptographic operations, and more particularly, to circuitry for performing cryptographic hashing operations for mining digital currencies such as cryptocurrencies. Mining circuitry and mining operations described herein may be used for any digital medium of exchange such as digital currencies, credits, rewards, or points.

While the example of using circuitry to perform cryptographic operations for mining cryptocurrencies is sometimes described herein as an example, in general, the systems and methods described herein may be applied to any desired system for performing cryptographic operations such as cryptographic hashing operations (e.g., for encrypting or decrypting sensitive data, for protecting communications prior to data transmission of an unsecure medium, for obscuring or scrambling sensitive data, etc.).

Figure 1:
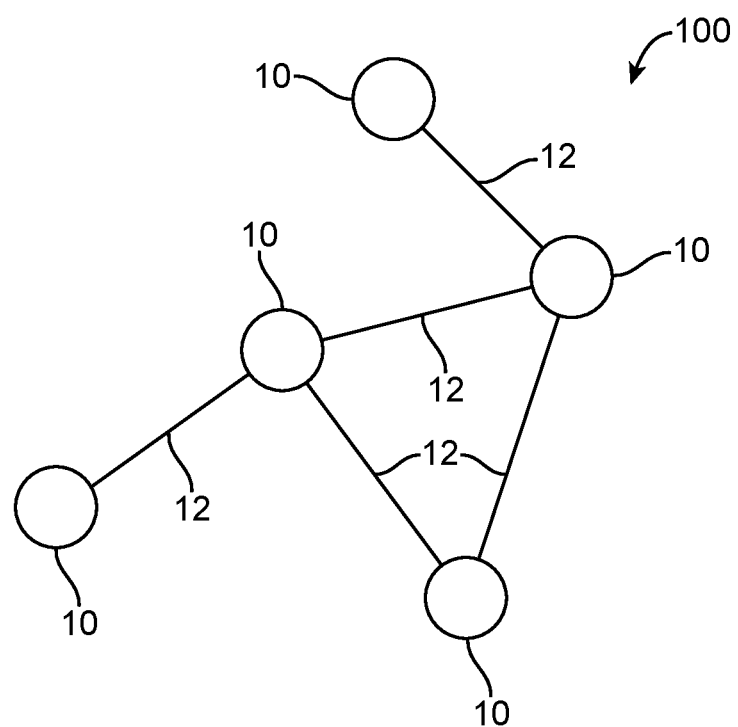
FIG. 1 is an illustrative diagram of a network of nodes having cryptographic hashing circuitry that may be used to mine digital currency in accordance with an embodiment of the present invention.

In the example where cryptographic operations are performed for maintaining or mining a digital cryptocurrency, a network of peers (nodes) may be provided that maintain and/or mine the digital crypto-currency according to a crypto-currency protocol such as the Bitcoin protocol. FIG. 1 is an illustrative diagram of a peer-to-peer network 100 that may operate according to the Bitcoin protocol. Network 100 includes nodes 10 that are coupled to other nodes via paths 12. Nodes 10 may be electronic devices such as desktop computers, laptop computers, cellular telephones, servers, or other electronic devices that implement the Bitcoin protocol. Each node 10 may communicate with other nodes of network 100 over paths 12. Paths 12 may, for example, include network paths such as network cables and packet forwarding devices (e.g., switches, routers, etc.) that couple nodes 10 to other nodes. This example is merely illustrative. Nodes 10 of network 100 may be coupled via any desired underlying communications technology such as wired or wireless network technologies and network 100 may include any desired number of nodes (e.g., tens, hundreds, thousands, millions, or more).

Nodes 10 may communicate over paths 12 according to the Bitcoin protocol in maintaining the cryptocurrency. For example, nodes 10 may communicate to maintain a global ledger of all official transactions. Each node 10 may store a copy of the global ledger (e.g., a complete copy or only a partial copy). Transactions added to the global ledger by each node 10 may be verified by other nodes 10 to help ensure validity of the ledger.

Figure 2:
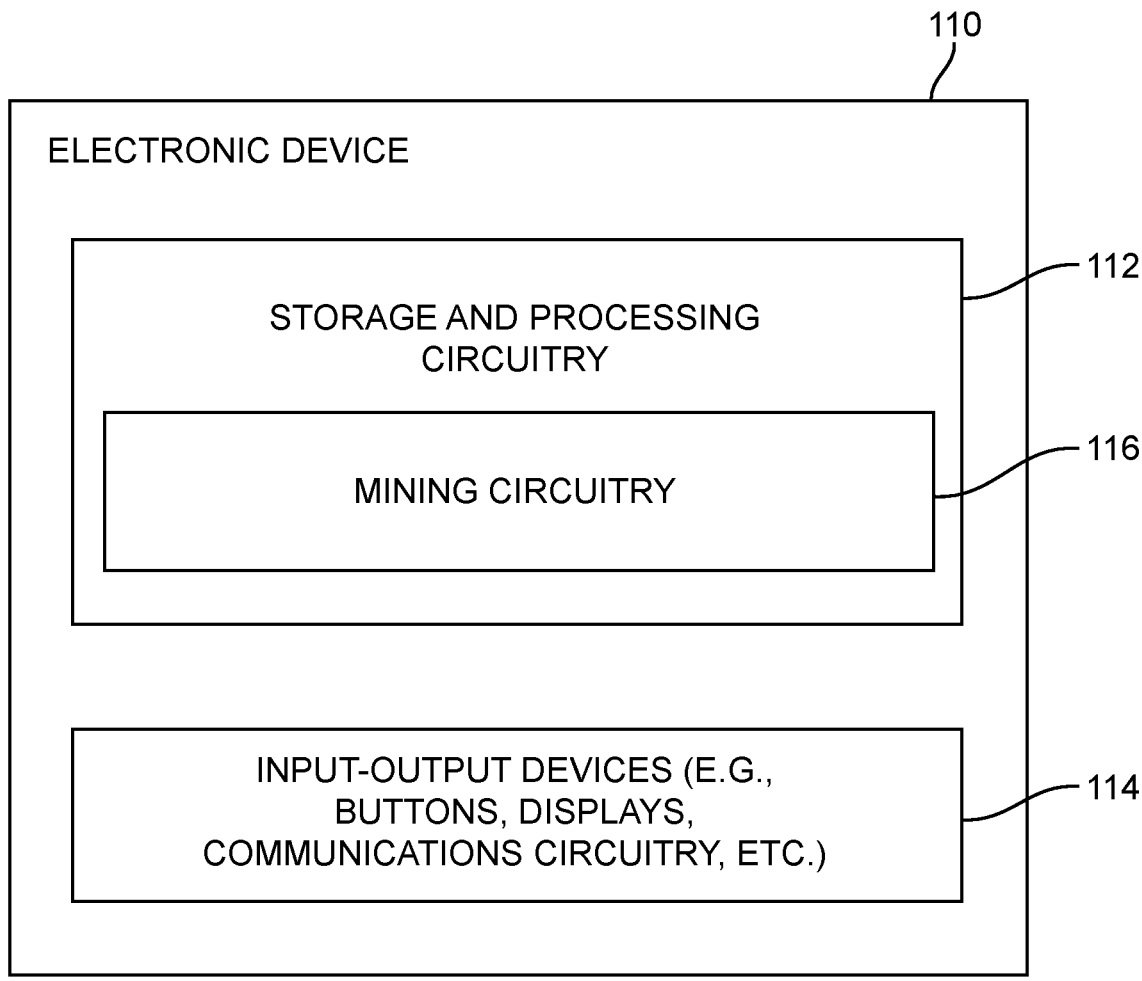
FIG. 2 is an illustrative diagram of an electronic device that may include cryptographic hashing circuitry in accordance with an embodiment of the present invention.

FIG. 2 is an illustrative diagram of an electronic device 110 that may serve as a node in a peer-to-peer network (e.g., as a node 10 of FIG. 1). As shown in FIG. 2, device 10 may include storage and processing circuitry 112. Storage and processing circuitry 112 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 112 may be used to control the operation of device 10. This processing circuitry may be based on one or more general purpose processing circuits such as microprocessors, microcontrollers, and digital signal processors, or dedicated processing circuits such as application specific integrated circuits, etc.

Device 10 may be provided with input-output devices 114 such as buttons, speakers, microphones, displays, and other input-output devices that accommodate user interaction with device no. Input-output devices 114 may include communications circuitry for communicating with other devices (e.g., other nodes of a cryptocurrency network). Mining circuitry 116 may perform mining operations such as verifying cryptocurrency transactions (e.g., while sharing any rewards or the mining operations between multiple entities such as a user of the device). Mining circuitry 116 may record the rewards in the global ledger. Mining circuitry 116 may, for example, be an integrated circuit chip. Electronic device no may include one or more of these chips that may be operated together or independently.

Electronic device 110 may be a desktop computer, a server in a rack-based system, a portable electronic device such as a tablet computer, laptop computer, or a cellular telephone. These examples are merely illustrative. Mining circuitry 116 may be provided to any desired electronic device that can communicate with other nodes of a cryptocurrency network. For example, a flash drive that connects with a computer may be provided with mining circuitry 16. In this scenario, the mining circuitry 16 may operate to perform mining operations by utilizing computer resources when the flash drive is connected to a computer (e.g., by utilizing power from the computer and a network connection between the computer and nodes of a cryptocurrency network).

FIG. 3 is a diagram of an illustrative cryptocurrency transaction 120 that may be verified using mining circuitry such as circuitry 16 of FIG. 2. As shown in FIG. 3, transaction 120 may include header information 122, a set of one or more inputs 124, and a set of one or more outputs 126.

Header information 122 may include one or more header fields including information that helps to identify the transaction. For example, the header fields may include a version number identifying the version of the Bitcoin protocol that is used. As another example, the header fields may include a current timestamp and/or other information on the transaction.

Digital currency may be stored in digital wallets that serve as sources or destinations of transactions. For example, a transaction may transfer funds from a source wallet to a destination wallet. Digital wallets may be formed using any desired data structure and may sometimes be referred to as digital accounts. Wallets may be identified using encryption schemes such as public-key cryptography in which a public-private key pair is assigned to each wallet. The public key of a wallet may serve to publicly identify the wallet (e.g., a public address to which funds may be directed), whereas the private key may be used by the owner of the wallet to sign transactions (e.g., thereby verifying the authenticity of the transactions).

Transaction 120 may identify an input 124 (e.g., a source of funds) and a set of outputs (e.g., destinations). The inputs and outputs may, for example, be digital wallets in which currency is stored. The inputs may refer to an output of a previous transaction as a source of funding or may identify that transaction 120 is an originating transaction that creates new currency (sometimes referred to as a coinbase transaction).

FIG. 4 is a diagram of an illustrative transaction 130 that transfers currency from a source wallet to a destination wallet. As shown in FIG. 4, input 124 may include a previous transaction identifier, an output identifier, and a signature. If desired, header information 122 of FIG. 3 such as version number or timestamp information may be included in the transaction of FIG. 5.

The previous transaction identifier may identify which transaction of the global ledger contains the source wallet. The previous transaction identifier may, if desired, identify the previous transaction TXPREV by a hash (e.g., H(TXPREV)) or double-hash (e.g., H(H(TXPREV))) of the previous transaction. The output identifier may identify which output of the identified previous transaction serves as the source wallet of transaction 130. For example, the outputs 126 of the previous transaction may be enumerated and the index of the source wallet may serve as the output identifier.

Transaction 130 may be signed to help ensure authenticity of the transaction. For example, the private key of the source wallet may be used to encrypt transaction 130 or a portion of transaction 130 to generate the signature that is stored in transaction 130. The public key of the source wallet may be used by others (e.g., other network nodes) to decrypt the signature and confirm the authenticity of the transaction.

The set of outputs 126 identifies one or more destination wallets and a respective amount to transfer from the source wallet to each destination wallet. In the example of FIG. 4, the transaction includes one destination wallet and a corresponding amount to be transferred from the source wallet to the destination wallet. Multiple destination wallets (e.g., two, three, four, or more) may be listed along with corresponding amounts to be transferred to each destination wallet from the source wallet. If desired, the source wallet identified by input 124 may also be listed as a destination wallet. For example, the amount to be transferred to the destination wallet may be less than the amount identified by the output of the previous transaction as belonging to the source wallet. In this scenario, the difference between the amount of the source wallet and the transfer amount may be assigned to the source wallet as an additional output entry. If desired, the amount assigned in outputs 126 to the source wallet may be less than the difference between the originally stored amount and the transfer amount. In this scenario, the difference between original source amount and the sum of amounts in output 126 may serve as additional reward for any miner that verifies the transaction (e.g., in addition to any predetermined reward defined by the cryptocurrency protocol).

FIG. 5 is an illustrative diagram of an originating transaction (i.e., coinbase transaction) that may generate new digital currency. As shown in FIG. 5, transaction 140 includes information that identifies the transaction as a coinbase transaction. The information may include a reserved coinbase identifier 142, a block height 144, and an extra-nonce value 146. If desired, header information 122 of FIG. 3 such as version number or timestamp information may be included in the transaction of FIG. 5.

Reserved coinbase identifier 142 may be a value that is reserved for coinbase transactions. Block height 144 may help identify where the coinbase transaction is located within the global ledger (e.g., which block of a block chain that represents the global ledger). Extra-nonce value 146 is an arbitrary value that may be modified during mining operations.

In contrast to normal transactions such as transaction 130 of FIG. 4, coinbase transaction 140 does not provide a source of funds for outputs 126. Instead, coinbase transaction 140 may create new currency. The amount of new currency created is determined by the cryptocurrency protocol. For example, nodes of the cryptocurrency network may communicate and establish an agreed-upon reward that is created for verifying transactions. The agreed-upon reward may be determined based on the size of the global ledger (e.g., how many recorded blocks are in the global ledger). As an example, the reward for verifying and recording transactions in the Bitcoin protocol may reward a number of bitcoins (units of currency) such as 25 bitcoins. This example is merely illustrative, as the number of bitcoins rewarded may be less than 25 (e.g., 12.5, 6.25, etc.) or may even be zero.

In some scenarios, transactions that are verified using mining circuitry may include fees. For example, transaction 130 of FIG. 4 may assign fewer bitcoins to destination wallets than contained in the source wallet. In this scenario, the remainder may serve as fees (e.g., an additional reward) for a miner. This additional reward may be assigned to the miner's wallet in coinbase transaction 140 or may also be partitioned by the mining circuitry between the miner's wallets and other wallets (e.g., profit-sharing wallets).

Figure 6:
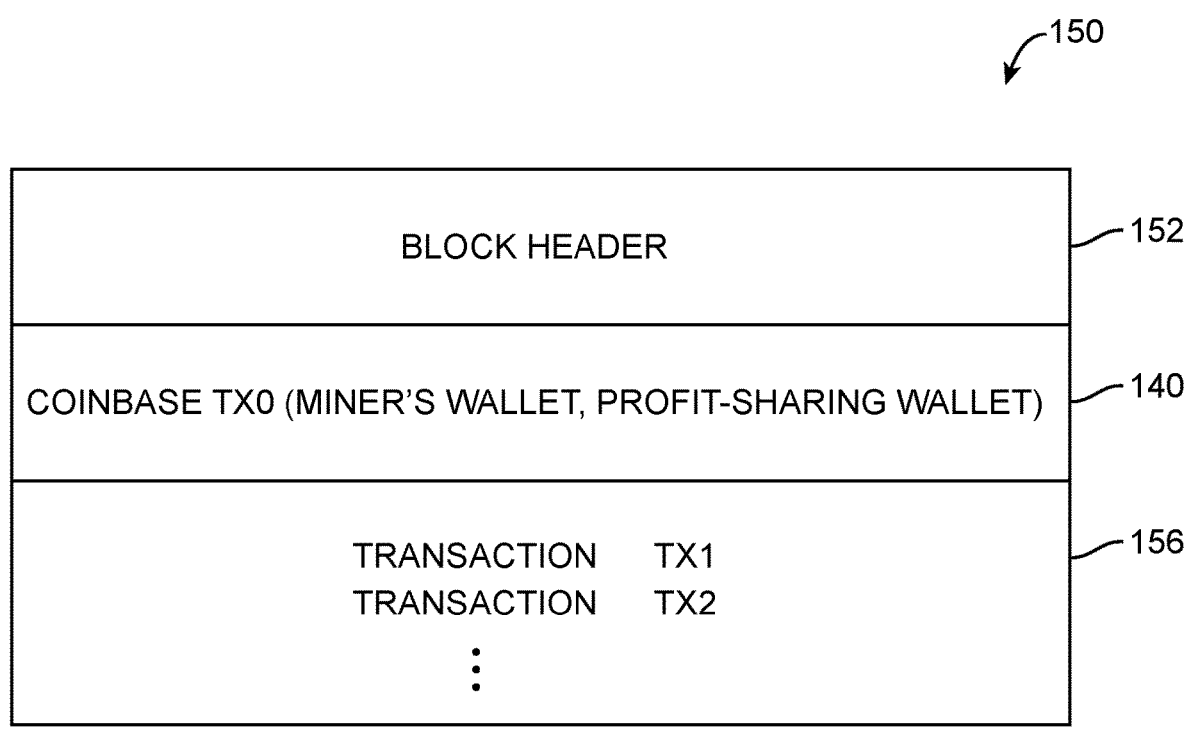
FIG. 6 is an illustrative block that may be generated by mining circuitry and recorded in a global ledger in accordance with an embodiment of the present invention.

In performing mining operations to verify and record a set of transactions, mining circuitry may generate a block to be recorded in the global ledger as shown in FIG. 6. Block 150 of FIG. 6 may include block header 152, coinbase transaction TX0 (e.g., a coinbase transaction 140), and a set of transactions 156 to be recorded.

Figure 7:
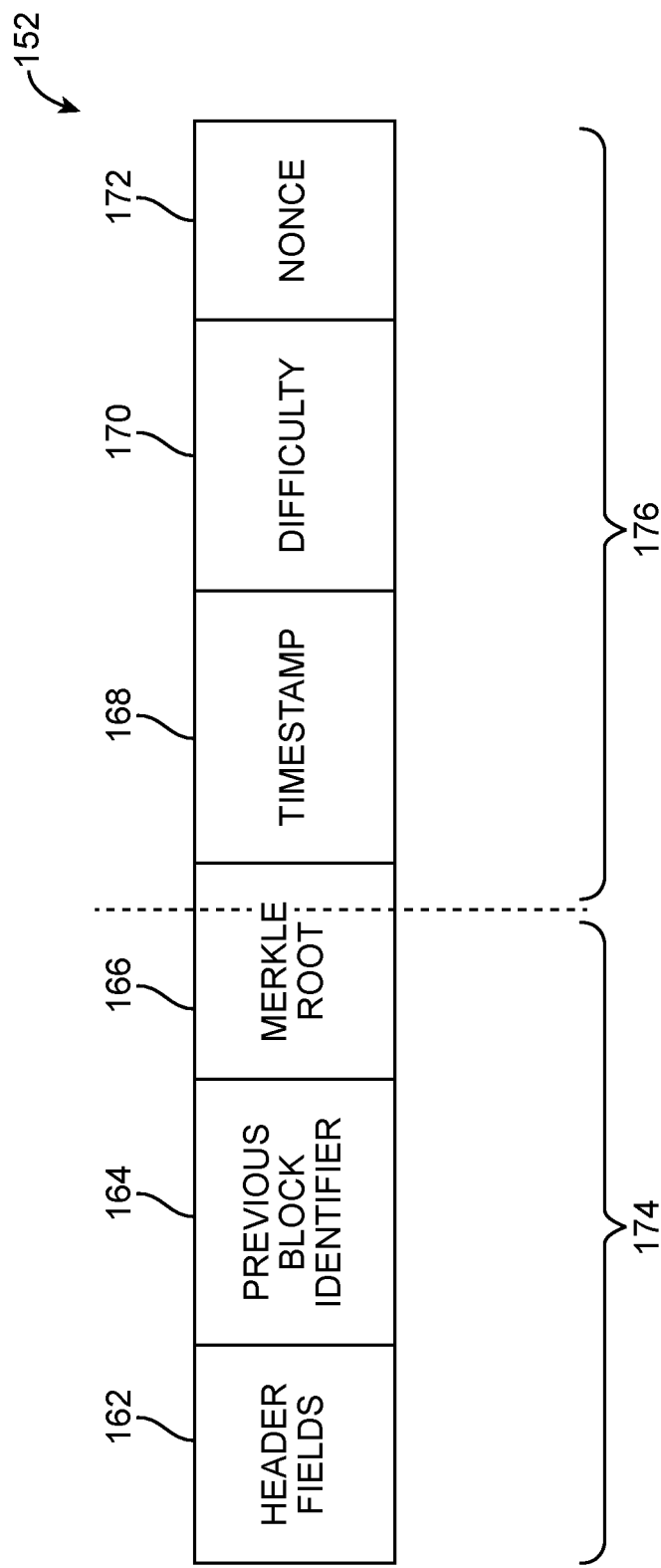
FIG. 7 is an illustrative block header that may be generated by mining circuitry in solving a cryptographic puzzle in accordance with an embodiment of the present invention.

Block header 152 may include information that identifies block 150 and additional information generated by the mining circuitry to complete a function such as information satisfying a cryptographic puzzle. The additional information may be generated to solve the function (e.g., puzzle) for a given set of function inputs that are at least partially determined by block header 152 and for a desired output or range of outputs. FIG. 7 is a diagram of an illustrative block header 152. As shown in FIG. 7, block header 152 may include header fields 162, a previous block identifier 164, a Merkle root 166, a timestamp 168, a difficulty value 170, and a nonce value 172.

Header fields 162 may include any desired header fields such as a version number of the Bitcoin protocol. Previous block identifier 164 may identify a previous block in the global ledger (e.g., the global ledger may be a chain of blocks 152 in which each block references a previous block in the chain). For example, the previous block identifier may be a hash of the block header of the previous block.

Merkle root 166 may be generated from the transactions of block 150 including coinbase transaction 140 and the set of transactions 156. Merkle root 166 may provide a compact representation of the transactions in block 150. For example, Merkle root 166 may be a 256-bit (32 Byte) value, whereas the transactions of block 150 may be hundreds, thousands, or millions of bytes.

Difficulty value 170 is a parameter of the function (e.g., cryptographic puzzle) that is solved with block 150. For the Bitcoin protocol, the cryptographic puzzle involves generating block header 152 such that the hash of block header 152 is less than a predetermined value. The hash may be calculated using a protocol-determined hash function such as the Secure Hash Algorithm (SHA). The predetermined value may depend on difficulty value 170. For example, difficulty value 170 may specify how many leading zeros in a binary data representation are required in the hashed block header value.

Mining circuitry 116 may adjust one or more of the fields in block header 152 in order to provide block header 152 with a hash value that solves the cryptographic puzzle (e.g., a sufficiently small hash value). For example, the mining circuitry may adjust the nonce value or the timestamp value. As another example, the mining circuitry may adjust the extra-nonce value in the coinbase transaction of the block, which indirectly adjusts the Merkle root. Mining circuitry 116 may perform exhaustive search by iterating over all possible solutions to the cryptographic puzzle.

Hash functions used by the cryptographic puzzle may operate in sequential steps (sometimes referred to herein as stages) on block header 152. If desired, a first portion 174 of block header 152 may be processed in a first hashing stage, whereas a second portion 176 of block header 152 may be processed in a second, subsequent hashing stage. Each hashing stage may involve a number of so-called rounds of logical operations. Each round of logical operations may involve the same logical functions (e.g., operating on different inputs for each round). For example, the output of a given round of logical operations in the hashing function may serve as an input for a subsequent round of the logical operations. The logical operations may iteratively be performed in this way to produce an output of the hashing function. For example, when a Secure Hashing Algorithm (SHA) 256 function is used, second portion 176 of block header 152 may be operated on by 64 rounds of SHA-256 before producing a hash output (e.g., an initial input to logical circuitry implementing the SHA-256 hashing algorithm may be operated on by the logic circuitry and provided as an input to a subsequent round of logic circuitry identical to the previous round of logical circuitry, and so on until the desired number of rounds of logic functions have been performed). This example is merely illustrative. The number of rounds of hashing may depend on the hashing algorithm performed by mining circuitry 116.

Portion 174 may include header fields 162, previous block identifier 164, and a first portion of Merkle root 166, whereas portion 176 may include a second portion of Merkle root 166, timestamp 168, difficulty value 170, and nonce value 172. The SHA function may produce an output value for the first stage based on portion 174 of block header 152. The output value of the first stage may serve as an input to the second stage of the SHA function along with portion 176 of block header 152. The second stage of the SHA function may produce the hash value of block header 152. The SHA function may be implemented using dedicated hardware circuitry on mining circuitry 116.

Figure 8:
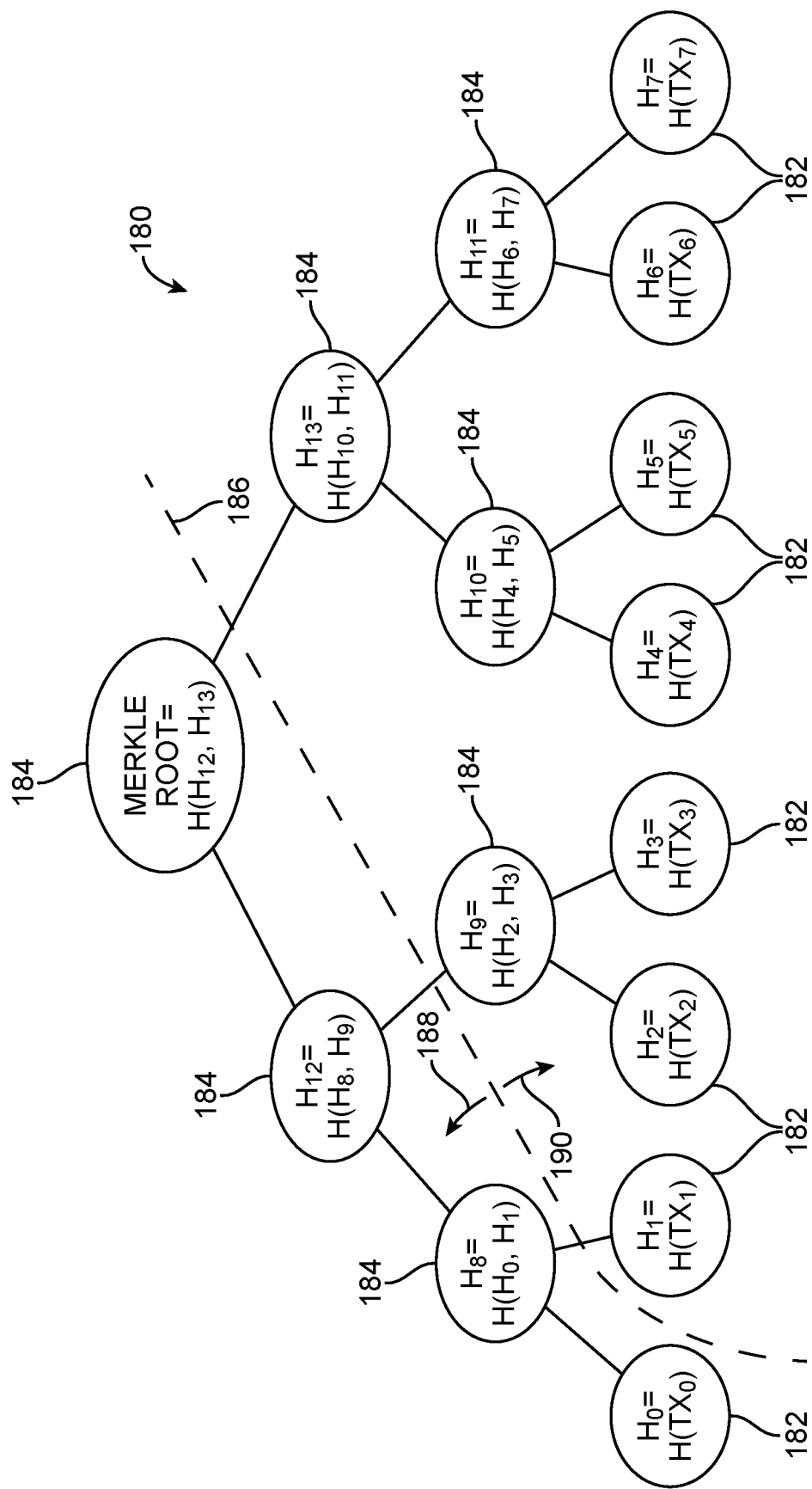
FIG. 8 is an illustrative Merkle tree that may be calculated by mining circuitry from a set of transactions in solving a cryptographic puzzle in accordance with an embodiment of the present invention.

Merkle root 166 may be computed by generating a Merkle tree from the transactions of the corresponding block 150. FIG. 8 is a diagram of an illustrative Merkle tree 180 generated from a block including transactions TX0, TX1, TX2, TX3, TX4, TX5, TX6, and TX7. The example of FIG. 8 in which the block includes eight transactions is merely illustrative. A Merkle tree may be computed from any binary number of transactions (e.g., 2, 4, 6, 8, etc.). If a block does not contain a binary number of transactions, placeholder transactions may be added to complete the Merkle tree. Such placeholder transactions are used only in generating the Merkle tree and are not added to the block.

As shown in FIG. 8, Merkle tree 180 includes leaf nodes 182 that are each generated by computing the hash of a respective transaction (e.g., using the SHA function). For example, hash value H0 is computed from the (double) hash of transaction TX0 (e.g., a coinbase transaction), whereas hash values H1, H2, H3, H4, H5, H6, and H7 are computed from transactions TX1, TX2, TX3, TX4, TX5, TX6, and TX7, respectively.

Merkle tree 180 may be organized as a binary tree in which each non-leaf node 184 has two child nodes. The nodes of each successive level of the tree may be computed by hashing nodes of a lower (previous) level. The second level of the tree (e.g., the nodes storing hash values H8, H9, H10, and H11) may be generated by hashing the values stored in leaf nodes 182. For example, hash value H8 is generated by concatenating leaf values H0 and H1 and hashing the concatenated result. Similarly, the third level of the tree may be generated by hashing the values of the second level (e.g., hash value H12 may be calculated by hashing the concatenation of H8 and H9, whereas hash value H13 may be calculated by hashing the concatenation of H10 and H11). The number of levels in the tree may depend on the number of transactions in the block. In the example of FIG. 8, the root of Merkle tree 180 is at the fourth level and is calculated from hashing values H12 and H13.

The hashed value at each node of Merkle tree 180 has a fixed, predetermined size (e.g., 256 bits), and is dependent on the values at the children of that node. The Merkle root therefore serves as a compact representation of all of the transactions in the corresponding block, because any changes to a transaction percolate upwards to the Merkle root. For example, changes to coinbase transaction TX0 causes hash value H8 to change, which modifies hash value H12, which then modifies the Merkle root value. Similarly, changes to any of the transactions result in changes to the Merkle root value.

Mining circuitry 116 may generate some or all of Merkle tree 180 while searching for solutions to a cryptographic puzzle. For example, in iterating through extra-nonce values in a coinbase transaction TX0, the mining circuitry may need to re-compute the Merkle root for each new extra-nonce value. To help reduce computation time and improve performance, the mining circuitry may re-compute only a portion of Merkle tree 180 during each iteration. In particular, changes to coinbase transaction TX0 only affect hash values H0, H8, H12, and the Merkle root, whereas the remaining nodes of the Merkle tree are unchanged. Dotted line 186 represents the edge of the Merkle tree that separates hash values that need to be recomputed and hash values that remain unchanged when modifying coinbase transaction TX0. Nodes to the left of edge 186 need to be recomputed (portion 188 of tree 180), whereas nodes to the right of edge 186 do not need to be recomputed (portion 190 of tree 180). The mining circuitry can store the constant nodes at edge 186 and reuse the stored values to re-compute the Merkle root. In the example of FIG. 8, hash values H1, H9, and H13 may be stored, whereas the remaining hash values of tree portion 190 do not need to be stored. If desired, nodes to the left of edge 186 may be computed off-chip by circuitry external to mining circuitry 116 (e.g., to save processing time, power, and chip area on mining circuitry 116).

Figure 9:
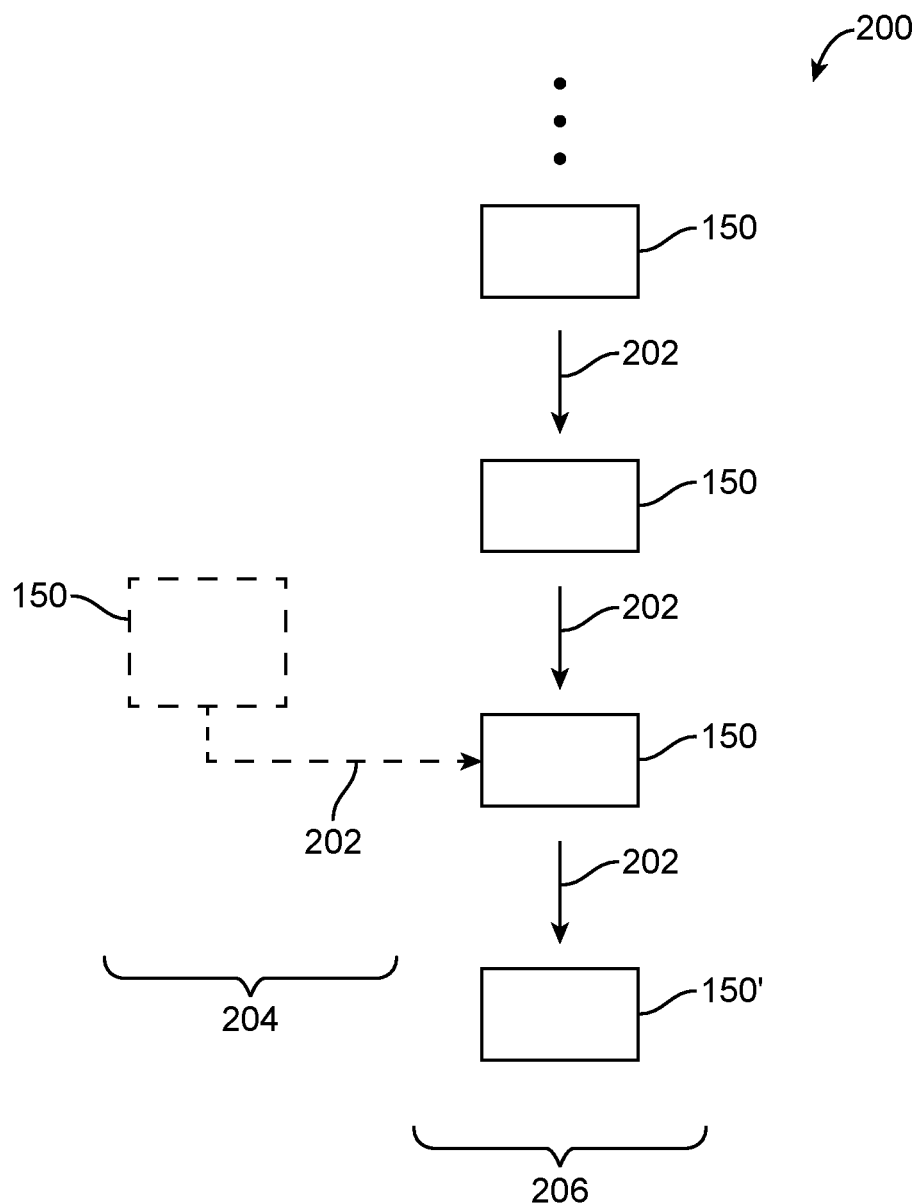
FIG. 9 is an illustrative block chain that may be maintained by a network of nodes as a global ledger of digital currency transactions in accordance with an embodiment of the present invention.

FIG. 9 is an illustrative diagram of a global ledger that is formed from a block chain 200. As shown in FIG. 9, block chain 200 may include an originating block 150' that does not point to any previous block. For example, the previous block identifier 164 of block 150' does not identify any other blocks. Each successive block 150 identifies the previous block in the chain as shown by arrows 202 (e.g., the previous block identifier 164 of each block identifies the previous block in block chain 200).

During mining operations, a device collects a set of transactions that have not already been recorded in block chain 200. The mining circuitry may identify the last (most recently recorded) block in block chain 200. The mining circuitry may subsequently generate a new block 150 from the set of transactions such that the new block includes an identifier 164 that identifies the last block of block chain 200 and solves the cryptographic puzzle of the cryptocurrency protocol used by the block chain.

It is possible for block chain 200 to include multiple branches. For example, branch 204 may be generated when different puzzle solutions are discovered that each have the same previous block identifier. In this scenario, the branch that is longer and includes more blocks serves as the global register. In other words, branch 204 is ignored and the transactions in block 150 of branch 204 are not considered to be recorded, because branch 206 includes more blocks than branch 204 (i.e., four connected blocks in branch 206 compared to only three in branch 204).

Figure 10:
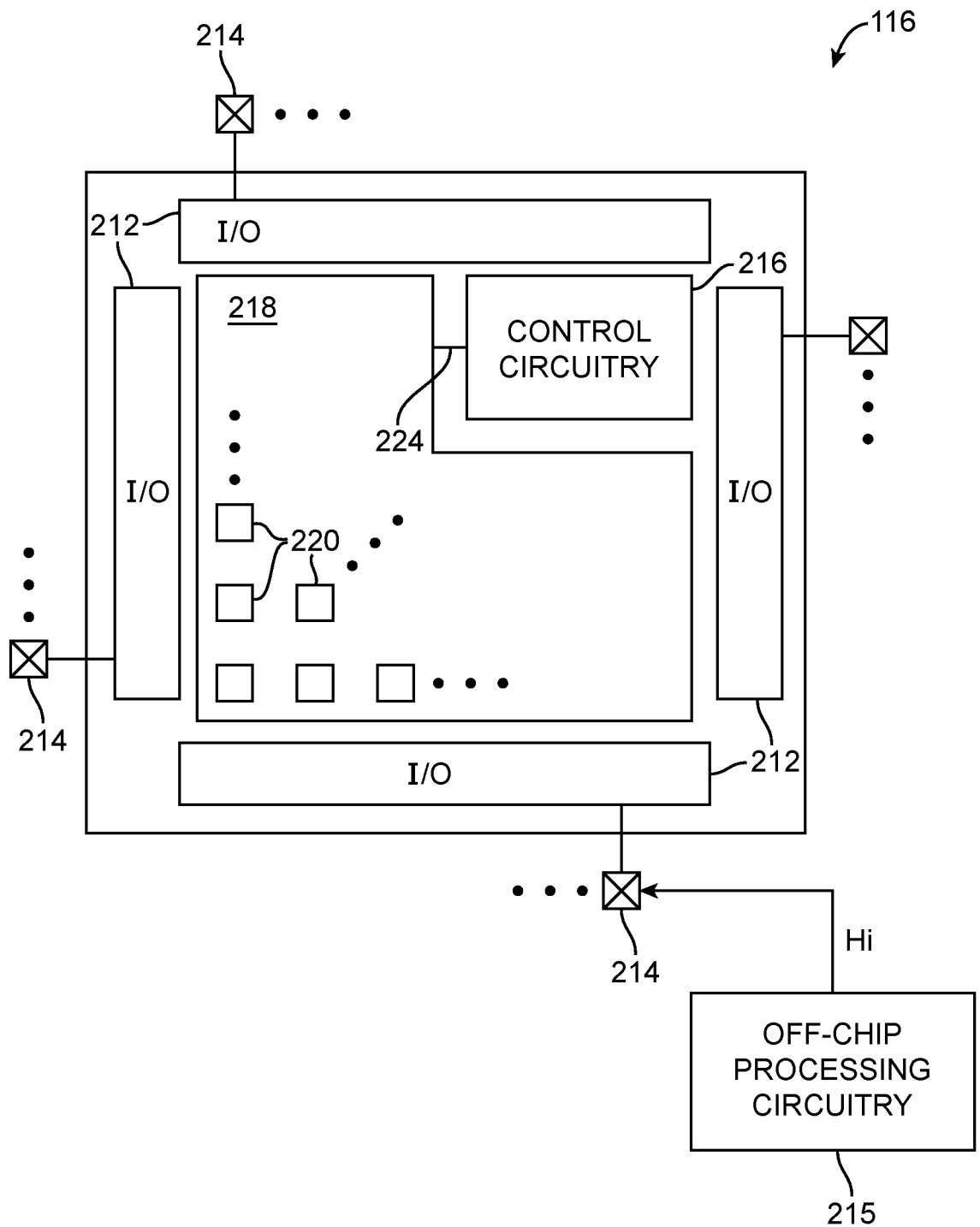
FIG. 10 is an illustrative diagram of mining circuitry including control circuitry and multiple processing cores for performing cryptographic hashing functions in parallel on corresponding portions of a search space in accordance with an embodiment of the present invention.

Mining circuitry such as circuitry 116 of FIG. 2 may be implemented as a dedicated integrated circuit (e.g., an application-specific integrated circuit) as shown in the diagram of FIG. 10. As shown in FIG. 10, integrated circuit 116 may have input-output (I/O) circuitry 212 for driving signals off of device 116 and for receiving signals from other devices via input-output pins 214. For example, I/O circuitry 212 and pins 214 may convey signals between mining circuitry 116 and other circuitry on electronic device no of FIG. 2. As shown in FIG. 10, mining circuitry 116 may receive data from off-chip processing circuitry such as processing circuitry 215. Off-chip circuitry 215 may be used to pre-compute portions of the hashing functions performed by circuitry 116. For example, off-chip circuitry 215 may compute hash values of portion 174 of block header 152 as shown in FIG. 7 and may provide the hash value (e.g., hash value $H_i$) to circuitry 116. Circuitry 116 may use hash value $H_i$ as an input when performing hashing functions on portion 176 of block header 152.

Mining circuitry 116 may include a core region 218 and control circuitry 216 that is coupled to the core region by paths 224 such as interconnect paths. Core region 218 may include multiple core circuits 220 that may be controlled by control circuitry 216 to identify solutions to a cryptographic puzzle. For example, each core circuit 220 may include dedicated logic that performs a cryptographic algorithm such as the SHA function on inputs provided by control circuitry 216 over paths 224. Core region 218 may include any desired number of core circuits that are operated in parallel by control circuitry 216 (e.g., tens, hundreds, or more core circuits).

The inputs provided by control circuitry 216 to a given core 220 may include a partially filled block header. For example, the partially filled block header may include header fields 162, previous block identifier 164, a current time, and difficulty value 170. The inputs may include the Merkle root of the transactions of the block to be solved, the transactions themselves, or sufficient information for computing the Merkle root (e.g., Merkle tree edge 186 of FIG. 8). The inputs may include initial hash values $H_i$ computed by off-chip processing circuitry 215. The remaining fields of the block header and block may be generated by core 220 in attempting to solve the cryptographic puzzle with inputs provided by the control circuitry.

Control circuitry 216 may partition the search space of possible solutions to the cryptographic puzzle and assign each core circuit 220 a different portion of the search space (e.g., so that multiple core circuits 220 operating in parallel can more efficiently search for solutions to the cryptographic puzzle). The search space may be partitioned based on the inputs provided by the control circuitry to the core circuits. The search space may be partitioned, for example, by assigning different ranges of nonce values 172 to different cores 220, by assigning different ranges of extra nonce values to different cores 220, etc.

If desired, each core circuit 220 in mining circuitry 116 may include dedicated logic that performs cryptographic hash functions such as Secure Hash Algorithm (SHA) functions. For example, cores 220 may perform SHA-2 hash functions (e.g., SHA-256 hash functions that are computed with 32-bit words as a message schedule input to each round of hashing and that outputs 256-bit hash outputs) on inputs provided by control circuitry 216 over paths 224.

Figure 11:
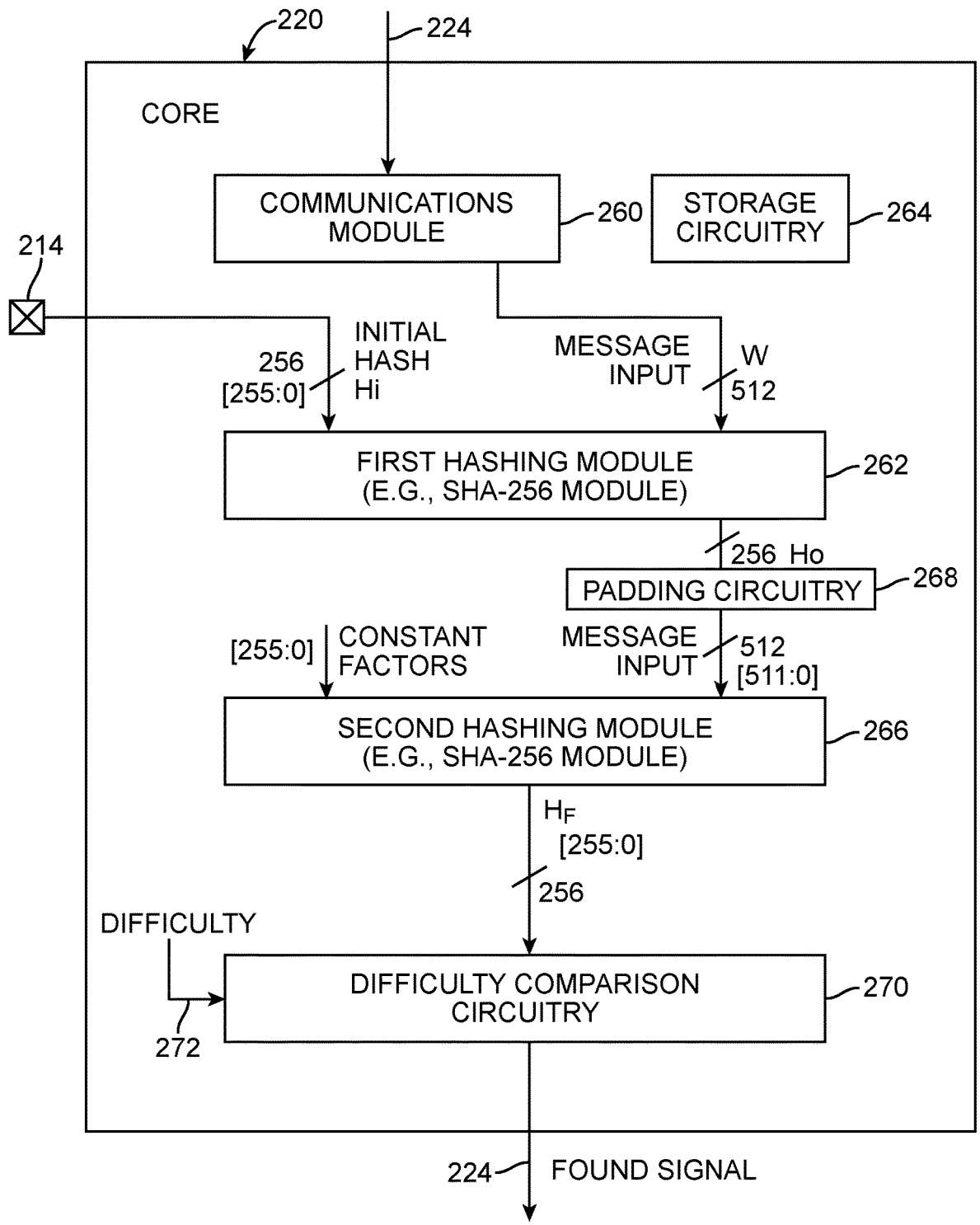
FIG. 11 is an illustrative diagram of a processing core in mining circuitry that may perform rounds of cryptographic hashing (e.g., SHA-256 hashing) in accordance with an embodiment of the present invention.

FIG. 11 is an illustrative diagram of an exemplary core 220 in circuitry 116 of FIG. 10. In the example of FIG. 1, circuitry 220 is used for performing SHA-256 hashing on inputs received from control circuitry 216. However, this is merely illustrative and in general, core 220 may be used to perform any desired hashing algorithm on inputs received from control circuitry 216 (e.g., for use in a bitcoin protocol, another digital currency protocol, or for use in a cryptographic system unrelated to a digital currency), or core 220 may be formed separate from mining circuitry 116 (e.g., on a dedicated integrated circuit or integrated circuit separate from mining circuitry 116) and may generally perform cryptographic hashing functions (e.g., SHA-256 hashing) on any desired input received from any desired source.

As shown in FIG. 11, core 220 may include communications circuitry such as communications module 260 that receives a message input W from control circuitry 216 via path 224. The message input W received from control circuitry 216 may include portions of block header 152 for use as an input to a SHA-256 hashing algorithm, for example. Core 220 may receive an initial hash input $H_i$ from external circuitry 215 via input/output port 214. The initial hash input $H_i$ may be computed off-chip based on a portion of a bit coin block header. For example, initial hash input $H_i$ may be computed at circuitry 215 by hashing portion 174 of block header 152 (e.g., using single or double hashing with a SHA-256 hashing protocol). Core 220 may include storage circuitry 264 that includes volatile and/or non-volatile memory.

If desired, core 220 may include multiple sequential hashing modules such as first hashing module 262 and second hashing module 266. First and second hashing modules 262 and 266 may be used to perform a double SHA-256 hash based on initial hash $H_i$ and the message input received on line 224. For example, first hashing module 262 (sometimes referred to herein as first SHA-256 module 262) may perform SHA-256 hashing on initial hash $H_i$ and message input W to produce a first hash output $H_o$. The first hash output $H_o$ may be provided as a message input to second hashing module 266 (sometimes referred to herein as second SHA-256 module 266). Second hashing module 266 may receive constant factors as an initial hash input (e.g., constant factors determined by the SHA-256 hashing algorithm such as one or more prime numbers). Second hashing module 266 may perform SHA-256 hashing on the constant factors using a message schedule based on first hash output $H_o$ to produce a second hash output $H_F$ (sometimes referred to herein as a final hash output).

In the example of FIG. 11, initial hash $H_i$ includes 256 bits whereas message input W includes 512 bits. First hash output $H_o$ may include 256 bits (e.g., as determined by the SHA-256 algorithm implemented by first hashing module 262). Core 220 may include padding circuitry 268 for padding first hash output $H_o$ with a desired number of zeros so that padded first hash output $H_o$ includes 512 bits (e.g., so that first hash output $H_o$ can be used as the 512-bit message input to second SHA-256 module 266). The constant factors input to second hashing module 266 may include 256 bits. Second hash output $H_F$ may include 256 bits (e.g., as determined by the SHA-256 algorithm implemented by second hashing module 266).

Core 220 may include difficulty comparison circuitry 270. Second hash output $H_F$ may be provided to difficulty comparison circuitry 270. Difficulty comparison circuitry 270 may compare second hash output $H_F$ to a predetermined difficulty value received at input 272. Difficulty value 272 may, for example, be received from control circuitry 216 or other desired external circuitry. Difficulty value 272 may, for example, be specified by the digital currency protocol implemented by mining circuitry 116 or by any other source (e.g., the difficulty value may be determined by the network of nodes operating on the bitcoin protocol and may be adjusted over time so that a predictable number of solutions to the cryptographic puzzles are computed by the entire network in a given time period). If second hash output $H_F$ satisfies the predetermined difficulty value (e.g., if a number of least significant zero bits as specified by the bitcoin protocol is sufficient or if value $H_F$ is less than the predetermined difficulty value), a found signal may be issued on line 224 indicating that a solution has been found for the given initial hash $H_1$ and message input W (e.g., for the bitcoin block header associated with the initial hash and message). If no solution is found, the search space may be changed (e.g., using a different timestamp field 168, difficulty field 170, nonce field 172, extra nonce field, etc.) and computation may be repeated until a solution is found, until the search space is changed, or until a new block 150 in block chain 200 (FIG. 9) is received.

Each hashing module 262 and 266 may perform multiple rounds of SHA-256 hashing (e.g., as specified by the SHA-256 hashing protocol). Each round of hashing may involve performing the same logical functions on an input to that round to produce an output for that round. Each round of hashing may receive a portion of the message input W (e.g., a 32-bit word of the message input or a modified 32-bit word derived from the message input W). The output of a given round may serve as an input for the next round (along with another word from the message input).

In a scenario sometimes described herein as an example (e.g., when operating under the Bitcoin or SHA-256 protocol), first hashing module 262 may perform 64 rounds of hashing based on initial hash $H_i$ and input message W to produce first hash output $H_o$. Similarly, second hashing module 266 may perform 64 rounds of hashing based on the constant factors and first hash output $H_o$ to produce second hash output $H_F$. In typical scenarios, each round of SHA-256 hashing performed by first hashing module 262 (or second hashing module 266) is performed by dedicated logic on core 220. The output of a first round of SHA-256 logic in first hashing module 262 may serve as an input to the second round of SHA-256 logic in first hashing module 262 (along with a word generated by message schedule logic based on input message W), the output of which may serve as an input to a third round of SHA-256 logic in first hashing module 262 (along with an additional word generated by the message schedule logic based on input message W), etc. Each round of SHA-256 performed by first hashing module 262 and second hashing module 266 may be performed on a hash input and a corresponding message input. The hash input and message input may be combined as determined by the SHA-256 protocol to produce a hash output used as a hash input of the subsequent round of SHA-256 hashing. The hash output of the final (e.g., $64^{th}$) round may be output as the hash output value $H_O$ or $H_F$.

Figure 12:
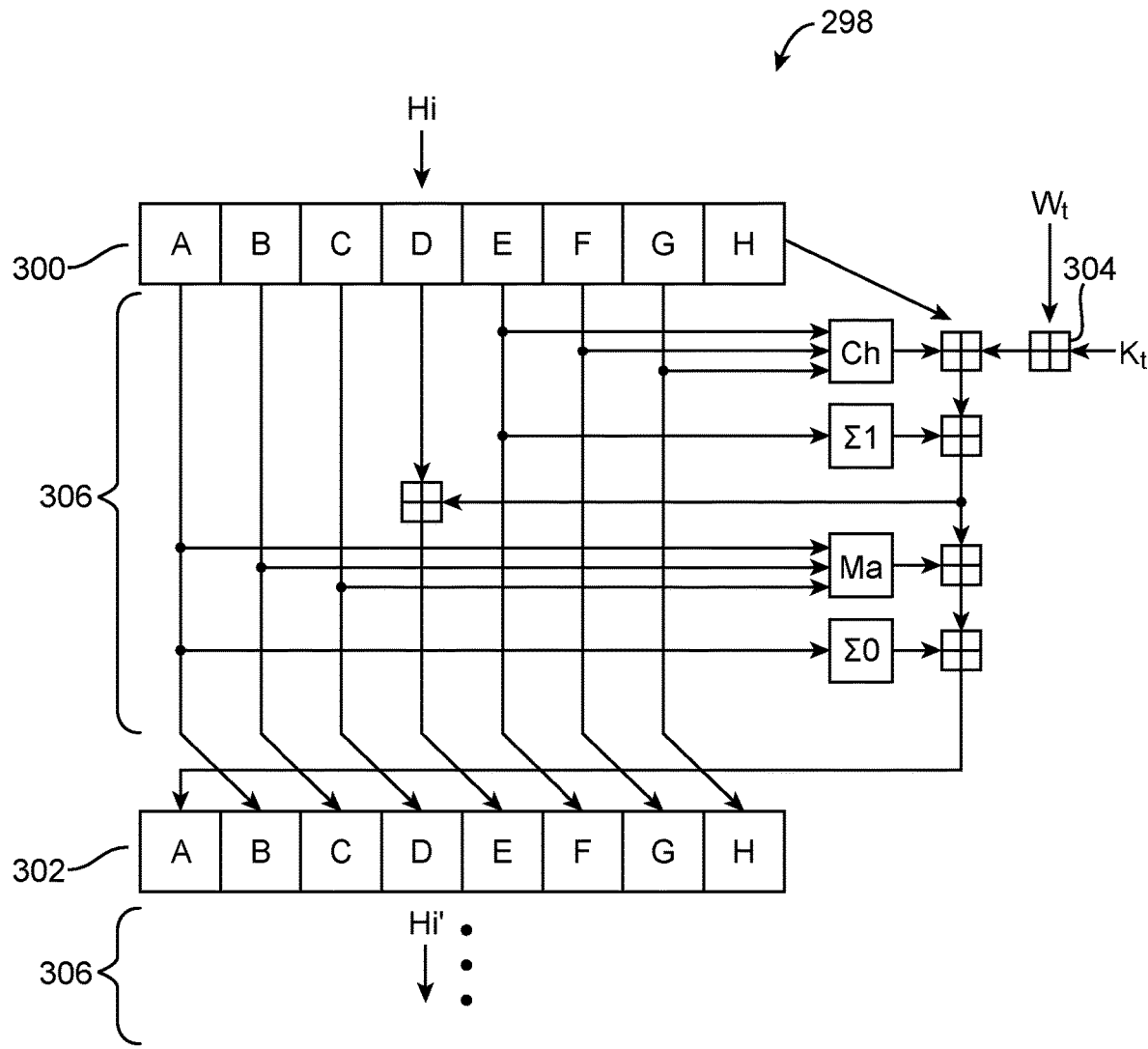
FIG. 12 is an illustrative diagram of a round of hashing logic that may perform a round of a hash schedule (e.g., a round of SHA-256 hashing) on an input hash value and a word received from message scheduling circuitry to generate a hash output in accordance with an embodiment of the present invention.

The logical operations implemented by the SHA-256 hashing protocol may be performed by dedicated logic hardware (e.g., hardcoded circuitry) on first and second hashing modules 262 and 266, for example. Performing logical operations using hardware may be significantly faster than performing the same logical operations using software. FIG. 12 is an illustrative diagram of a single round of the SHA-256 hashing function logic that may be formed using dedicated logic on core 220. The circuitry of FIG. 12 may be implemented on the first and/or second hashing modules of FIG. 11 and may be repeated on the hashing module for each number of rounds implemented by the hashing module (e.g., the circuitry of FIG. 12 may be repeated 64 times in each hashing module). The circuitry of FIG. 12 may sometimes be referred to herein as a hash schedule, hash scheduling circuitry, hash schedule logic, or hash scheduling logic.

As shown in FIG. 12, SHA-256 hashing circuitry 298 may include storage circuitry such as storage circuitry 300 and 302 (e.g., register circuitry 300 and 302). Register circuitry 300 may serve as an input register to the corresponding round of SHA-256 hashing logic 306. Data stored on register circuitry 300 may be passed to SHA-256 hashing logic 306 and operated on according to the SHA-256 hashing protocol (e.g., as shown in the logical diagram of FIG. 12). The output of SHA-256 logic 306 may be passed to output register 302. In typical arrangements, register circuitry 300 and 302 each include eight corresponding registers A-H (e.g., a first register A, a second register B, a third register C, etc.) that each stores a corresponding 32-bit hash value (e.g., register A may store the most significant 32 bits of initial hash $H_1$ whereas register H stores the least significant 32 bits of initial hash $H_i$ for the first round of hashing). In other words, a 256 bit hash input $H_i$ may be partitioned into eight 32-bit hash values A-H each stored on a corresponding register of input register circuitry 300. Each 32-bit hash value may be passed to logic 306 along with portions (words) $W_t$ of message input W. The output of logic 306 may be stored on register circuitry 302 (e.g., the output of logic 306 may be partitioned into 32-bit hash values A-H each stored on a corresponding register of output register circuitry 302).

As an example, hash schedule logic 298 of FIG. 12 may be a first round of SHA-256 hashing logic formed on hashing module 262. In this scenario, register 300 may receive and store initial hash $H_i$ received over input/output port 214 (e.g., partitioned into 32-bit hash portions A-H). A 32-bit input message word $W_t$ may be generated by message scheduling circuitry based on 512-bit input message W. Adder circuitry 304 (e.g., addition modulo 32 circuitry) may receive word $W_t$ from the message scheduling circuitry as well as a SHA-256 constant value $K_t$. Constant value $K_t$ may be specified by the SHA-256 hashing protocol and may correspond to the particular round number of SHA-256 implemented between registers 300 and 302 (e.g., $K_t$ may have a first value for the first round of SHA-256, a second value for the second round of SHA-256, a third value for the $64^{th}$ round of SHA-256, etc.).

Input word $W_t$ may be provided to hash scheduling circuitry 298 by corresponding message scheduling logic on core 220. The message scheduling logic may receive message input W from communications module 260 (FIG. 1) and may perform operations on message W according to the SHA-256 protocol to generate message input words $W_t$. For example, the message scheduling logic may perform logical operations on input message W and may output a single 32-bit word $W_t$ of the input message W after performing the logical operations at any given time. A corresponding message input word $W_t$ may be provided to adder 304 for each round of SHA-256 in hashing module 262 (e.g., a first word $W_0$ may be provided during the first round of SHA-256, a second word $W_1$ may be provided during the second round of SHA-256, etc.). Word $W_t$ may be the most significant word of the message stored in the message scheduling logic at a given time.

The 32-bit hash values stored on registers 300, the corresponding message input word $W_t$, and the corresponding round constant value $K_t$ may be passed to and processed by logic 306 as shown and defined in FIG. 12. The processed 32-bit hash values may be stored on output registers 302. The logical functions performed by logic blocks Ch, $\Sigma 1$, Ma, and $\Sigma 0$ in logic 306 are defined as shown in FIG. 12. The arrangement of logic circuitry 306 of FIG. 12 is determined by the SHA-256 protocol and is merely illustrative. In general, any desired logic may be formed in circuitry 306 for operating on input hash values stored in registers 300.

The 32-bit processed hash values stored in output registers 302 may be provided to a subsequent round of logic 306 (e.g., logic circuitry having the same configuration as shown in FIG. 1) and the output of the subsequent round of logic may be provided to an additional bank of register circuits. In this way, each of the 64 rounds of SHA-256 logic on hashing module 262 (or hashing module 266) may include corresponding logic circuitry 306 and register circuitry 300/302. In another suitable arrangement, the output of register 302 may loop back to register 300 for the two or more of the 64 rounds of SHA-256 hashing. After the final round of hashing 298 (e.g., the $64^{th}$ round), the processed hash value stored on registers 302 in the $64^{th}$ round of logic circuitry may be used as hash output $H_o$ of FIG. 11 (e.g., after passing through 64 rounds of logic 306, first hash output $H_o$ may be produced as the hash value stored on the final output register circuitry 302 of first hashing module 262). Hash output $H_o$ may be passed to second hashing module 266 (FIG. 11). Similar logic may be formed on second hashing module 266 to generate final hash output $H_F$ using the constant factors as the initial hash value stored on input registers 300 of second hashing module 266 and using a words from the message input corresponding to first hash output $H_o$.

Figure 13:
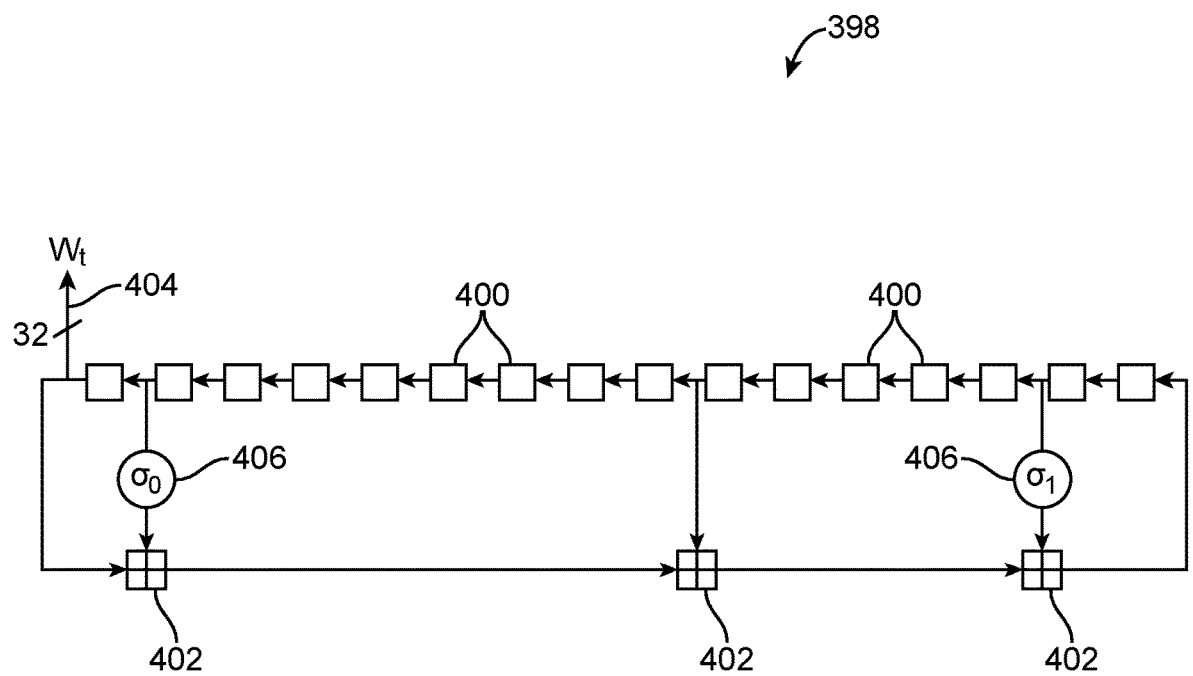
FIG. 13 is an illustrative diagram of message scheduling circuitry that may generate message words based on a received message and that may provide the message words to rounds of hashing logic of the type shown in FIG. 12 for generating a hash output in accordance with an embodiment of the present invention.

FIG. 13 is an illustrative diagram of message scheduling logic 398 formed on the first and/or second hashing modules of FIG. 11 for generating input words $W_t$ provided to hash schedule logic 298 based on received message W. An initial message such as 512-bit message input W of FIG. 11 may be stored in registers 400. Each register 400 may store a corresponding 32-bit portion (word) of message W. The stored message W may be shifted through registers 400 word-by-word for each round of SHA-256 performed by hash scheduling circuitry 298. The most significant 32-bit word $W_t$ after each shift through registers 400 may be provided as input word $W_t$ to the corresponding round of hash scheduling logic 298. In this way, each 32-bit input word $W_t$ is based on the message input W received from controller 216.

For example, during the first round of SHA-256 hash schedule 298 as shown in FIG. 12, a first most significant 32-bit word $W_t$ may be provided to adder 304 over path 404, and each word stored on registers 400 may be shifted over to the next register 400 (e.g., in a direction to the left as shown in FIG. 13). The most significant 32-bit word $W_t$ after shifting the words may be provided to adder 304 over path 404 and the words may be shifted again to the next register 400. This process may continue so that a different message input word $W_t$ is provided to each of the 64 rounds of SHA-256 hash scheduling logic 298. Some of the words stored on registers 400 may be passed to logic 406 and adder circuits 402 (addition modulo two adder circuits 402) and a corresponding word may be provided to the last (least significant) register 400 in message scheduling logic 398. In the example where message scheduling circuitry 398 is formed in first hashing module 262, the 512-bit message initially stored on registers 400 may be input message W received from controller 216. In the example where message scheduling circuitry 398 is formed on second hashing module 266, the 512-bit message initially stored on registers 400 may be first hash output $H_o$ (e.g., after padding to 512 bits using padding circuitry 268) generated by first hashing module 262. The arrangement of logic 406, registers 400, and adders 402 may be determined by the SHA-256 hashing protocol. This example is merely illustrative and, if desired, any arrangement of registers 400, logic 406, and adders 402 may be used for generating message words $W_t$.

Each core 220 in mining circuitry 116 may include first and second hashing modules 262/266. This example is merely illustrative and in general, cores 220 may include any desired number of hashing modules that perform any desired number of rounds of hashing using any desired hashing protocol. In the example of FIGS. 11-13, each core 220 may include 64 rounds of hash scheduling logic 298 (as shown in FIG. 12) and corresponding message scheduling logic 398 (as shown in FIG. 13) for computing hash values in parallel (e.g., for finding a solution to the cryptographic puzzle more efficiently than if only a single core is used). For example, the first hashing module of a first core 220 may include 64 rounds of hash scheduling logic 298, the first hashing module of a second core 220 adjacent to the first core may include 64 rounds of hash scheduling logic, etc. Each round of hashing logic may require a predetermined amount of chip area on mining circuitry 116 and a predetermined amount of power for computing SHA-256 hash functions. It may be desirable to be able to reduce area and power used by cores 220 for computing hash functions in parallel to reduce chip cost and increase power efficiency.

As shown in the example of FIG. 12, hash scheduling circuitry 298 computes hash values for each of output registers 302 based on the hash values stored in one or more registers of input circuitry 300 (e.g., each hash output value is not necessarily a function of each of the hash values A-H of the corresponding input register circuitry 300). For example, the output hash value stored in register B of output register circuitry 302 is simply the input hash value stored on register A of input register circuitry 300 (e.g., the hash value stored on input register A is shifted to output register B such that the output hash value stored in register B is not a function of any other input hash values B-H). Similarly, the output hash value stored in register C of output register circuitry 302 is equal to the input hash value stored on register B of input register circuitry 300 and the output hash value stored in register D of output register circuitry 302 is equal to the input hash value stored on register C of input register circuitry 300 (e.g., no processing or logical combination with other hash values is performed on input hash values A, B, and C for generating output hash values B, C, and D).

While output hash value E in output register circuitry 302 is computed as a function of input hash values D, E, F, G and H (including logical operations by adders 304 and logical functions Ch and Σ1), output hash value F in output register circuitry 302 is a simply equal to the input hash value E of input register circuitry 300, output hash value G in output register circuitry 302 is equal to the input hash value F of input register circuitry 300, and output hash value H is equal to the input hash value G of input register circuitry 300 (e.g., without being a function of any other input hash values). As the output register of a single round of hash scheduling circuitry 298 forms the input register of a subsequent round of hash scheduling circuitry 298, the input hash values B, C, D, F, G, and H are simply hash values stored in the input registers of the previous round of hash scheduling circuitry 298 (e.g., input hash value B of a given round is computed as being equal to the output hash value A of the previous round, input hash value C of a given round is computed as being equal to the output hash value B of the previous round, input hash value D of a given round is computed as being equal to the output hash value C of the previous round, input hash value F of a given round is computed as being equal to the output hash value E of the previous round, input hash value G of a given round is computed as being equal to the output hash value F of the previous round, and input hash value H of a given round is computed as being equal to the output hash value G of the previous round). Only input hash values A and E are computed as logical combinations of more than one output hash value of the previous round of hash scheduling circuitry 298. If desired, each hash value for registers B, C, D, F, G, and H may be determined based on a corresponding hash value A and E from previously performed rounds of hash scheduling circuitry 298.

Figure 14:
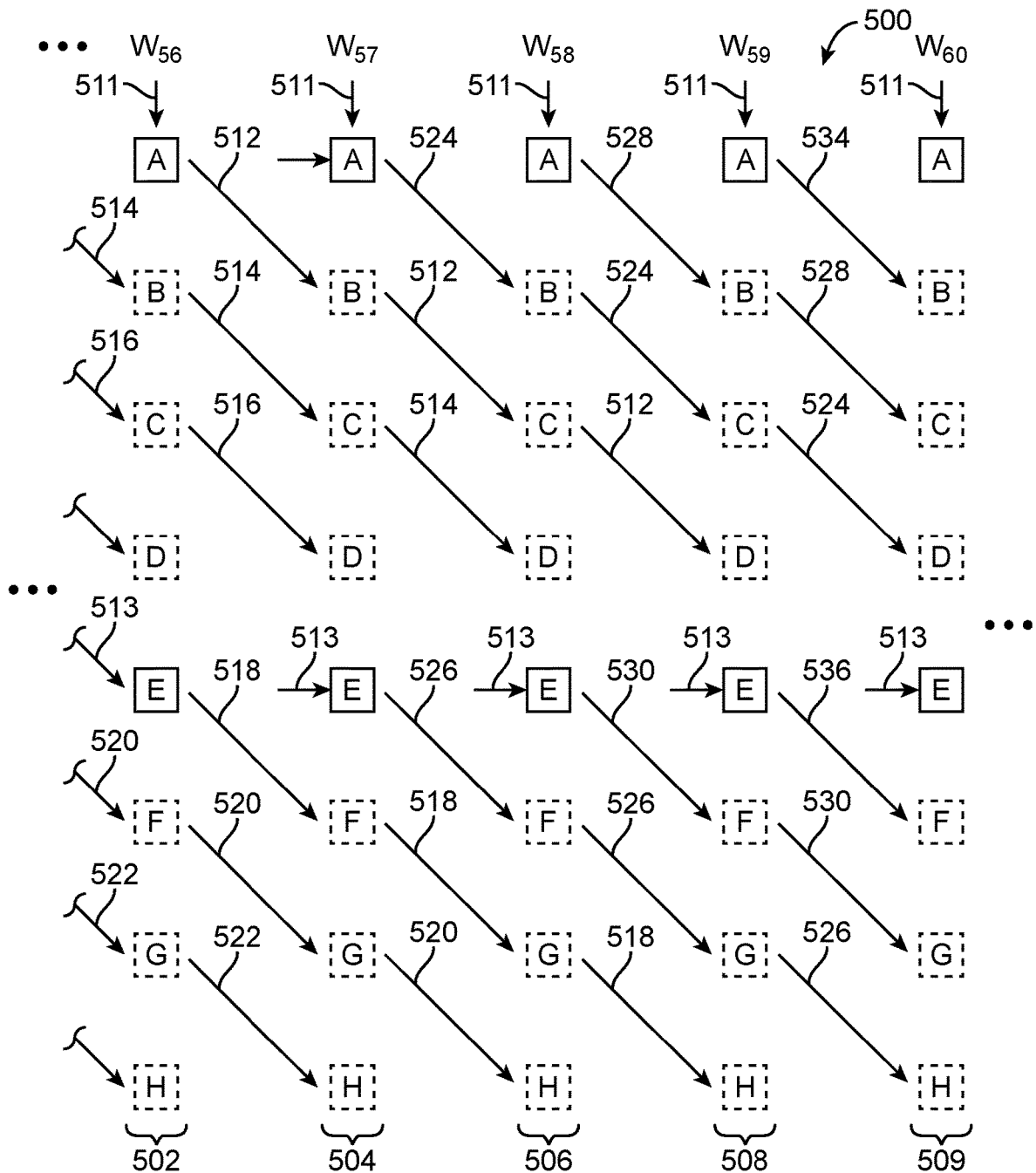
FIG. 14 is diagram of illustrative hashing circuitry showing how multiple rounds of hashing circuits of the type shown in FIG. 12 may be formed with only two hash registers per round for implementing a diagonal hashing scheme in which all possible hash values are obtained based on stored values in the two hash registers of previous hashing rounds in accordance with an embodiment of the present invention.

If desired, core circuitry 220 may be arranged to take advantage of these redundancies to reduce the amount of chip area and processing resources required for core 220. FIG. 14 is a diagram showing how multiple rounds of hash scheduling circuitry may be performed without forming register circuitry for storing each round of hash values B, C, D, F, G, or H.

As shown in FIG. 14, hash scheduling circuitry 500 may include a number of rounds 298 of SHA-256 hashing logic. Hashing circuitry 500 may be formed on, for example, first hashing module 262 or second hashing module 266 of FIG. 11. In the example of FIG. 14, five of the 64 rounds of SHA-256 hash scheduling are shown (e.g., a $56^{th}$ round having a state stored by registers 502, a $57^{th}$ round having a state stored by registers 504, a $58^{th}$ round having a state stored by registers 506, a $59^{th}$ round having a state stored by registers 508, and a $60^{th}$ round having a state stored by registers 509). The registers of $56^{th}$ hashing round 502 may be equivalent to output registers 302 of the $55^{th}$ round of hash scheduling 500 or input registers 300 of the $56^{th}$ round of hash scheduling circuitry 500, the registers of $57^{th}$ hashing round 504 may be equivalent to output registers 302 of the $56^{th}$ round of hash scheduling 500 or input registers 300 of the $57^{th}$ round of hash scheduling circuitry 500, etc. Each round of hashing may only include registers for hash values A and E, whereas each of hash values B-D and F-H are obtained from previously stored values A and E. This example is merely illustrative and, in general, the pattern of hash scheduling 500 shown in FIG. 14 may be repeated for each of the 64 rounds of hash scheduling. The $56^{th}$ through $60^{th}$ rounds are described herein as an example to illustrate features of the present invention.

As shown in FIG. 14, a first hash value may be stored on register A of $56^{th}$ round 502 based on hash values of previous rounds of scheduling 500 and a corresponding $56^{th}$ round word $W_{56}$ (e.g., generated by message scheduling circuitry 398 of FIG. 13 and received at input 511). Input arrow 511 may represent the logical combination of $56^{th}$ round word $W_{56}$ with the one or more hash values of the previous rounds as given by one or more rounds of logic 306 of FIG. 12. A second hash value may be stored on register E of $56^{th}$ round 502 based on hash values of previous rounds of scheduling circuitry 500 and based on $56^{th}$ round word $W_{56}$. Input arrow 513 may represent the combination of $56^{th}$ round word $W_{56}$ with the hash values of the previous rounds as given by logic 306 of FIG. 12. Stored hash values for each round may be used to obtain hash values for subsequent rounds (e.g., hash values for a given round may be obtained using hash values from previous rounds).

In the example of FIG. 14, the hash value B of $57^{th}$ round 504 may be obtained as the stored hash value A of $56^{th}$ round 502 as shown by path 512, the hash value C of $57^{th}$ round 504 may be obtained as the hash value B of $56^{th}$ round 504 as shown by path 514, and the hash value D of $57^{th}$ round 504 may be obtained as the hash value C of $56^{th}$ round 504 as shown by path 516 (e.g., based on the logical operations 306 shown in FIG. 12 in which output hash values B, C, and D are taken from input hash values A, B, and C, respectively, and where input hash values A, B, and C are the output hash values A, B, and C of the previous round).

Similarly, the hash value F of $57^{th}$ round 504 may be obtained as the stored hash value E of $56^{th}$ round 502 as shown by path 518, the hash value G of $57^{th}$ round 504 may be obtained as the hash value F of $56^{th}$ round 502 as shown by path 520, and the hash value H of $57^{th}$ round 504 may be obtained as the hash value G of $56^{th}$ round 502 as shown by path 522.

A hash value may be stored on register A of $57^{th}$ round 504 based on hash values of previous rounds of scheduling circuitry 500 and a corresponding $57^{th}$ round word $W_{57}$ (e.g., as shown by path 511). An additional hash value may be stored on register E of $57^{th}$ round 504 based on hash values of previous rounds of scheduling circuitry 500 and based on $57^{th}$ round word $W_{57}$ (e.g., as shown by path 513). The hash value B of $58^{th}$ round 506 may be obtained as the stored hash value A of $57^{th}$ round 504 as shown by path 524, the hash value C of $58^{th}$ round 506 may be obtained as the hash value B of $57^{th}$ round 504 as shown by path 512, and the hash value D of $58^{th}$ round 506 may be obtained as the hash value C of $57^{th}$ round 504 as shown by path 514. Because hash value B of $57^{th}$ round 504 is the same as stored hash value A of $56^{th}$ round 502, hash value C of $58^{th}$ round 506 may be computed as being equal to the stored hash value A of $56^{th}$ round 504 (as shown by path 512).

Similarly, the hash value F of $58^{th}$ round 506 may be obtained as the stored hash value E of $57^{th}$ round 504 as shown by path 526, the hash value G of $58^{th}$ round 506 may be obtained as the hash value F of $57^{th}$ round 504 as shown by path 518, and the hash value H of $58^{th}$ round 506 may be obtained as the hash value G of $57^{th}$ round 504 as shown by path 520. Because hash value F of $57^{th}$ round 504 is the same as stored hash value E of $56^{th}$ round 502, hash value G of $58^{th}$ round 506 may be computed as being equal to the stored hash value E of $56^{th}$ round 502 (as shown by path 518).

A hash value may be stored on register A of $58^{th}$ round 506 based on hash values of previous rounds of scheduling circuitry 500 and a corresponding $58^{th}$ round word $W_{58}$ (e.g., as shown by path 511). An additional hash value may be stored on register E of $58^{th}$ round 506 based on hash values of previous rounds of scheduling circuitry 500 and based on $58^{th}$ round word $W_{58}$ (e.g., as shown by path 513). The hash value B of $59^{th}$ round 508 may be obtained as the stored hash value A of $58^{th}$ round 506 as shown by path 528, the hash value C of $59^{th}$ round 508 may be obtained as the hash value B of $58^{th}$ round 506 as shown by path 524, and the hash value D of $59^{th}$ round 508 may be obtained as the hash value C of $58^{th}$ round 506 as shown by path 512. Because hash value B of $58^{th}$ round 506 is the same as stored hash value A of $57^{th}$ round 504, hash value C of $59^{th}$ round 508 may be computed as being equal to the stored hash value A of $57^{th}$ round 504 (as shown by path 524). Because hash value C of $58^{th}$ round 506 is the same as hash value B of $57^{th}$ round 504, which is the same as stored hash value A of $56^{th}$ round 502, hash value D of $59^{th}$ round 508 may be computed as being equal to the stored hash value A of $56^{th}$ round 502 (as shown by path 512).

Similarly, the hash value F of $59^{th}$ round 508 may be obtained as the stored hash value E of $58^{th}$ round 506 as shown by path 530, the hash value G of $59^{th}$ round 508 may be obtained as the hash value F of $58^{th}$ round 506 as shown by path 526, and the hash value H of $59^{th}$ round 508 may be obtained as the hash value G of $58^{th}$ round 506 as shown by path 518. Because hash value F of $58^{th}$ round 506 is the same as stored hash value E of 57$^{th}$ round 504, hash value G of 59$^{th}$ round 506 may be computed as being equal to the stored hash value E of 57$^{th}$ round 504 (as shown by path 526). Because hash value G of 58$^{th}$ round 506 is the same as hash value F of 57$^{th}$ round 504, which is the same as stored hash value E of 56$^{th}$ round 502, hash value H of 59$^{th}$ round 508 may be computed as being equal to the stored hash value E of 56$^{th}$ round 502 (as shown by path 518).

In this way, each of hash values B-D and F-H may be obtained as stored hash values A and E from one of three previous rounds of hashing circuitry 500. In general, hash value B for any given round of hashing circuitry 500 may be computed as being equal to the stored hash value A from the round immediately prior to the given round of hashing circuitry (e.g., hash value B of 56$^{th}$ round 502 may be obtained by retrieving the stored hash value A of the 55$^{th}$ round as shown by path 514, hash value B of 58$^{th}$ round 506 may be obtained by retrieving the stored hash value A of 57$^{th}$ round 504 as shown by path 524, hash value B of 60$^{th}$ round 509 may be obtained by retrieving the stored hash value A of 59$^{th}$ round 508 as shown by path 534, etc.). Hash value F for any given round of hashing circuitry 500 may be determined as being equal to the stored hash value E from the round immediately prior to the given round of the hashing circuitry (e.g., hash value F of 56$^{th}$ round 502 may be obtained by retrieving the stored hash value E of the 55$^{th}$ round as shown by path 520, hash value F of 58$^{th}$ round 506 may be obtained by retrieving the stored hash value E of 57$^{th}$ round 504 as shown by path 526, hash value F of 60$^{th}$ round 509 may be obtained by retrieving the stored hash value E of 59$^{th}$ round 508 as shown by path 536, etc.).

In general, hash value C for any given round of hashing circuitry 500 may be determined as being equal to the stored hash value A from two rounds prior to the given round of the hashing circuitry (e.g., hash value C of 57$^{th}$ round 504 may be obtained by retrieving the stored hash value A of the 55$^{th}$ round as shown by path 514, hash value C of 58$^{th}$ round 506 may be obtained by retrieving the stored hash value A of 56$^{th}$ round 502 as shown by path 512, hash value C of 60$^{th}$ round 509 may be obtained by retrieving the stored hash value A of 58$^{th}$ round 506 as shown by path 528, etc.). Similarly, hash value G for any given round of hashing circuitry 500 may be determined as being equal to the stored hash value E from two rounds prior to the given round of the hashing circuitry (e.g., hash value G of 57$^{th}$ round 504 may be obtained by retrieving the stored hash value A of the 55$^{th}$ round as shown by path 520, hash value G of 58$^{th}$ round 506 may be obtained by retrieving the stored hash value E of 56$^{th}$ round 502 as shown by path 518, hash value G of 60$^{th}$ round 509 may be obtained by retrieving the stored hash value E of 58$^{th}$ round 506 as shown by path 530, etc.).

In addition, hash value D for any given round of hashing circuitry 500 may, in general, be computed as being equal to the stored hash value A from three rounds prior to the given round of the hashing circuitry (e.g., hash value D of 57$^{th}$ round 504 may be obtained by retrieving the stored hash value A of the 54$^{th}$ round as shown by path 516, hash value D of 59$^{th}$ round 508 may be obtained by retrieving the stored hash value A of 56$^{th}$ round 502 as shown by path 512, hash value D of 60$^{th}$ round 509 may be obtained by retrieving the stored hash value A of 57$^{th}$ round 504 as shown by path 524, etc.). Similarly, hash value H for any given round of hashing circuitry 500 may be determined as being equal to the stored hash value E from three rounds prior to the given round of the hashing circuitry (e.g., hash value H of 57$^{th}$ round 504 may be obtained by retrieving the stored hash value E of the 54$^{th}$ round as shown by path 522, hash value H of 59$^{th}$ round 508 may be obtained by retrieving the stored hash value A of 56$^{th}$ round 502 as shown by path 518, hash value H of 60$^{th}$ round 509 may be obtained by retrieving the stored hash value E of 57$^{th}$ round 504 as shown by path 526, etc.). In this way, each hash value B-D of a given round may be obtained by retrieving a stored hash value A from one of the three rounds of circuitry 500 immediately prior to the given round, whereas each hash value E-H of a given round may be obtained by retrieving a stored hash value E from one of the three rounds of circuitry 500 immediately prior to the given round. Individual registers B-D and F-H for each round thereby need not be formed for recording the state of any given round of hashing circuitry 500.

Similarly, each stored hash value A may be generated based on stored hash values A from four previous rounds of hashing circuitry 500, whereas each stored hash value E may be computed based on stored hash values A from four previous rounds of hashing circuitry 500. As shown in FIG. 12, each hash value A is computed as a function of the output hash values B, C, E, F, G, and H of the previous round and each hash value E is computed as a function of the output hash values D, E, F, G, and H of the previous round. As hash values B-H are obtained based only on stored hash values A and E of previous rounds, hash values A and E of a given round are therefore also based only on stored values A and E of previous rounds.

For example, hash value B of a given hashing round number N is obtained by retrieving (e.g., reading) a stored hash value A from the previous hashing round number N−1 (e.g., hash value B for round N=59 is retrieved from register A of 58$^{th}$ round 506 as shown by path 528), hash value C of a given round N is obtained by retrieving a stored hash value A from the previous hashing round number N−2 (e.g., hash value C for round N=59 is retrieved from register A of 57$^{th}$ round 504 as shown by path 524), and hash value D of a given round N is obtained by retrieving a stored hash value A from the previous hashing round number N−3 (e.g., hash value D for round N=59 is retrieved from register A of 56$^{th}$ round 502 as shown by path 512). Similarly, each hash value F of a given hashing round number N is obtained by retrieving a stored hash value E from the previous hashing round number N−1, each hash value G of a given hashing round number N is obtained by retrieving a stored hash value E from the previous hashing round number N−2, and each hash value H of a given hashing round number N is obtained by retrieving a stored hash value E from the previous hashing round number N−3.

In general, the stored hash value A of a given hash round number N is determined based on hash values A, B, C, D, E, F, G, and H of previous hash round number N−1 (e.g., using the logical operations 306 of FIG. 12). Hash values B, C, and D from previous hash round number N−1 are obtained by retrieving stored hash value A and hash values B and C, respectively, of previous hash round number N−2 (e.g., based on the algorithm of FIG. 12). Hash values B and C of previous hash round number N−2 are obtained by retrieving stored hash value A and hash value B, respectively, of previous hash round number N−3. Hash value B of previous hash round number N−3 is obtained by retrieving stored hash value A of previous hash round number N−4. Similarly, the stored hash value E of given hash round number N is determined based on hash values E, F, G, and H of previous hash round number N−1 (e.g., using the logical operations 306 of FIG. 12). Hash values F, G, and H of previous hash round number N−1 are obtained by retrieving stored hash value E and hash values F and G, respectively, of previous hash round number N−2 (e.g., based on the algorithm of FIG. 12). Hash values F and G of previous hash round number N−2 are obtained by retrieving stored hash value E and hash value F of previous hash round number N−3. Hash value F of previous hash round number N−3 is obtained by retrieving stored hash value E of previous hash round number N−4.

In other words, each of the hash values may be obtained by retrieving and/or performing logical operations on hash values stored in registers A and E of each of the previous four rounds of hashing circuitry 500 (e.g., rounds N−1, N−2, N−3, and N−4 for a given round N). After 64 rounds of hashing circuitry 500, the final state of the $64^{th}$ round may be obtained by reading stored hash values A and E of the $64^{th}$ round and by reading stored hash values B-D and F-H from registers A and E of the $60^{th}$-$63^{rd}$ rounds of hashing circuitry 500. Since each possible output of hashing circuitry 500 may be obtained by retrieving/outputting values determined only based on stored values A and E, hardware for registers B-D and F-H may be omitted from hashing circuitry 500 (e.g., hash values may be stored only in registers A and E without the need for shifting hash values to registers for hash values B-D and F-H in subsequent rounds). Registers B-D and F-H are denoted in FIG. 14 by dashed boxes to indicate physical registers need not be formed for the corresponding state to be output by hashing circuitry 500. In contrast, any desired hash values B-D and F-H may be implicitly determined by obtaining the output of registers A and E of previous rounds. By forming hashing circuitry 500 without registers B-D and F-H, processing resources and chip area on core 220 may be significantly reduced, thereby allowing for improved computational efficiency and reduced power requirements for core 220. The hashing circuitry of FIG. 14 may sometimes be referred to herein as diagonal hashing circuitry because each hash value B-D and F-H can be obtained by retrieving a stored value from a register A or E along a corresponding diagonal path.

Hash values output by each round of hashing circuitry 500 may sometimes be referred to as hash output values. Hash output values output by the final round of hashing circuitry 500 (e.g., the $64^{th}$ round of circuitry 500) may sometimes be referred to herein as a final hash value or final hash output value that is output from circuitry 500. Hash output values output by rounds prior to the final round of hashing circuitry 500 may sometimes be referred to herein as intermediate hash values, working values, working variables, intermediate working values, intermediate working variables, working hash values, working hash variables, intermediate working hash values, or intermediate working hash variables.

Figure 15:
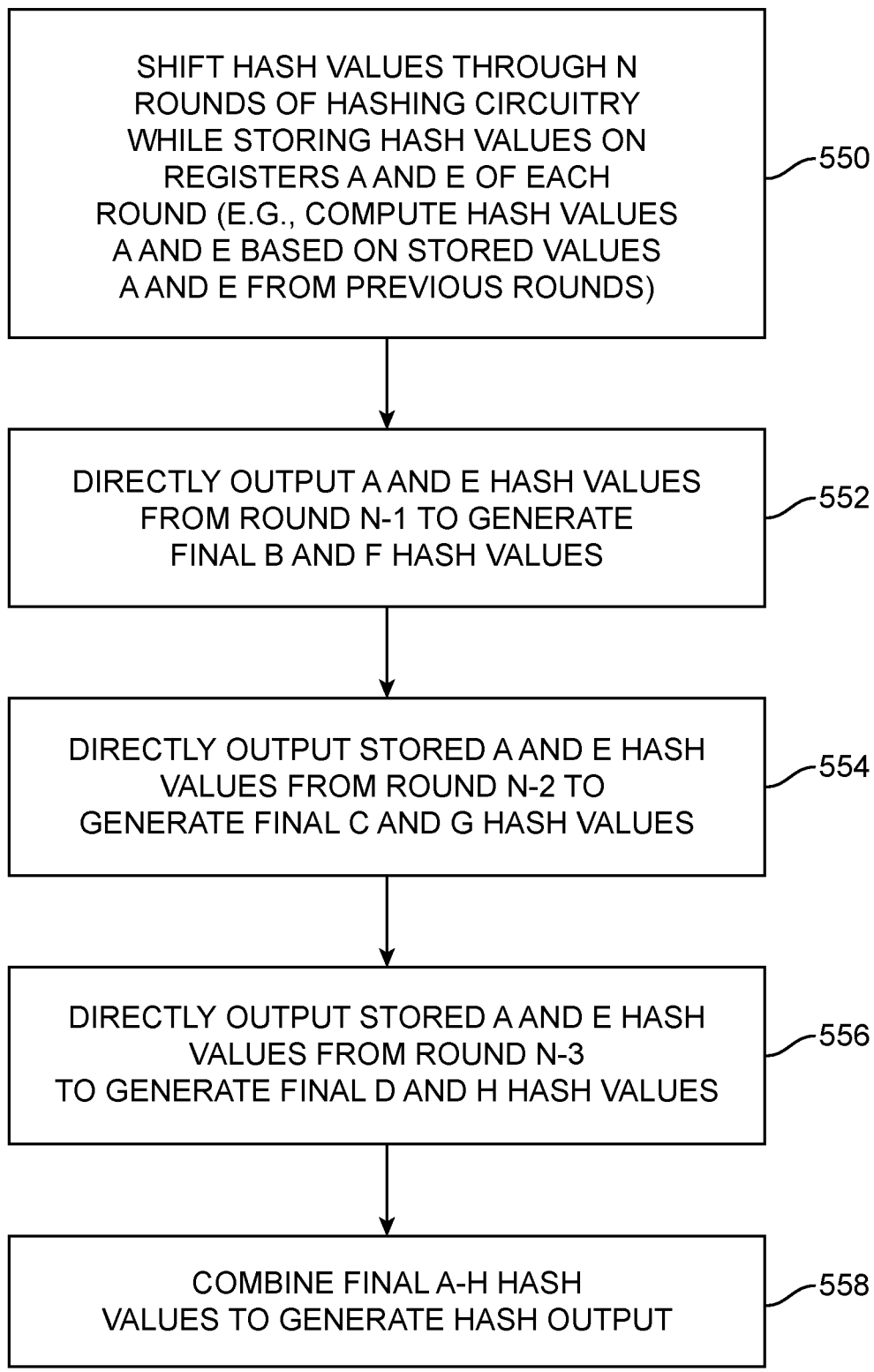
FIG. 15 is a flow chart of illustrative steps that may be performed by hashing circuitry of the type shown in FIG. 14 to generate an output hash value based on stored hash values in previous hashing rounds in accordance with an embodiment of the present invention.

FIG. 15 is a flow chart of illustrative steps that may be performed by hashing circuitry 500 of the type shown in FIG. 14 for generating a final hash output value based on stored values A and E from previous hashing rounds.

At step 550, hashing circuitry 500 may shift hash values through N rounds of hashing circuitry while storing hash values only on registers A and E of each round (e.g., where hash values A and E are computed based on stored values A and E from previous rounds). In the example of FIG. 14, hashing circuitry 500 may shift hash values through sixty-four rounds of hashing circuitry. The stored hash values in registers A and E of the $64^{th}$ round of circuitry 500 may be output and identified as final hash values A and E (e.g., portions A and E of a final hash value given by the string A|B|C|D|E|F|G|H, where "|" represents the concatenation operator).

At step 552, hash values stored on registers A and E in the N−1 round of hashing circuitry may be directly output from hashing circuitry 500 (e.g., without passing through any register circuitry in later rounds) and identified as final B and F hash values, respectively. For example, the stored values in registers A and E of the $63^{rd}$ round of circuitry 500 may be output and identified as the respective final hash values B and F (e.g., portions B and F of the final hash value A|B|C|D|E|F|G|H).

At step 554, hash values stored on registers A and E in the N−2 round of hashing circuitry may be directly output from hashing circuitry 500 without being stored at any other register circuitry in later rounds of hashing circuitry 500 and may be identified as final C and G hash values, respectively. For example, the stored values in registers A and E of the $62^{nd}$ round of circuitry 500 may be directly output from the hashing circuitry and identified as the respective final hash values C and G (e.g., portions C and G of the final hash value A|B|C|D|E|F|G|H).

At step 556, hash values stored on registers A and E of the N−3 round of hashing circuitry may be directly output from hashing circuitry 500 without being stored at any other register circuitry in later rounds of hashing circuitry 500 and may be identified as final D and H hash values, respectively. For example, the stored values in registers A and E of the $61^{st}$ round of circuitry 500 may be output directly from the hashing circuitry and identified as the respective final hash values D and H (e.g., portions D and H of the final hash value A|B|C|D|E|F|G|H).

A step 558, the final hash values A-H may be combined (e.g., by concatenating the final A and E values stored at step 550 with the final B and F values read at step 552, the final C and G hash values read at step 554, and the final D and H hash values read at step 556) to generate a final hash output value (e.g., final hash output value A|B|C|D|E|F|G|H). The final hash output value may, for example, be passed to difficulty comparison circuitry (e.g., in scenarios where hashing circuitry 550 is formed on second hash module 266) or may be passed to padding circuitry (e.g., in scenarios where hashing circuitry 500 is formed on first hash module 262).

Figure 16:
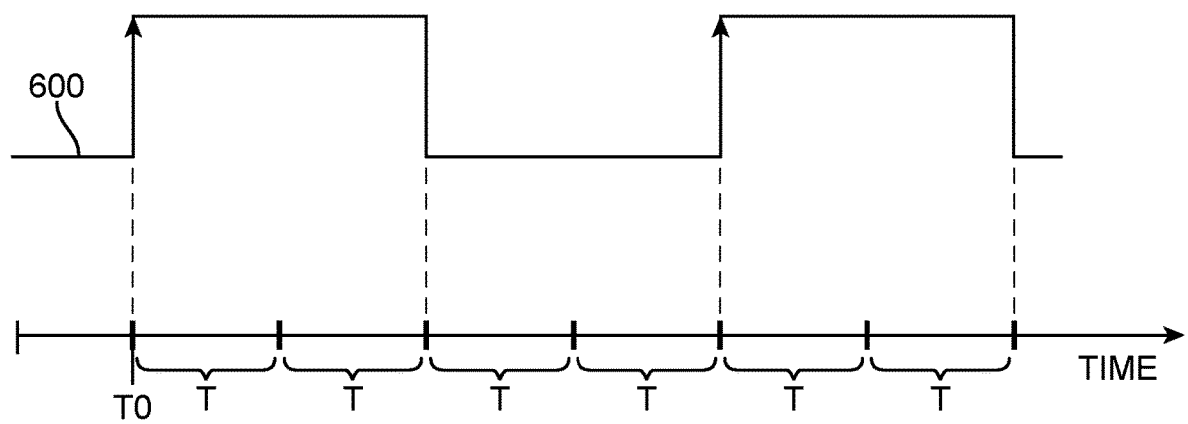
FIG. 16 is an illustrative timing diagram showing how registers of the type shown in FIG. 14 may latch data after four message words have been received from message scheduling circuitry in accordance with an embodiment of the present invention.

FIG. 16 is an illustrative timing diagram showing how clock signals may be provided to hashing circuitry 500 of FIG. 14 for generating a hash output based on stored hash values A and E from previous hashing rounds. As shown in FIG. 16, a clocking signal 600 may be provided to a given round of hashing circuitry 500. Registers A and E of hashing circuitry 500 may, for example, latch data on a rising edge of clocking signal 600.

At time T0, a rising edge of clock signal 600 may be provided to registers A and E of the given round of hashing circuitry 500 and registers A and E may latch data (e.g., may latch data output by four previous rounds of registers A and E that has been logically combined with a corresponding message words $W_t$). Message scheduling circuitry 398 of FIG. 13 may provide different message words $W_t$ to hash scheduling circuitry 500 every time period T. After four time periods T have elapsed (e.g., after four rounds worth of message words $W_t$ are provided), a rising edge of clock signal 600 may control registers A and E to latch new data. Clock signal 600 may be provided with a rising edge every 4*T time period to allow four rounds of logical calculations to be performed for generating the next value to store on registers A (e.g., because each value A is computed based on four previous rounds of stored values). If desired, words $W_t$ may be precomputed by message circuitry 398 and provided to hash circuitry 500 every time period T (e.g., because the time to compute a given word $W_t$ is generally much shorter than the time period required to compute a hash value A or E). The example of FIG. 16 is merely illustrative. If desired, registers A and E may latch on falling edges of clock signal 600 or based on any other trigger.

Figure 17:
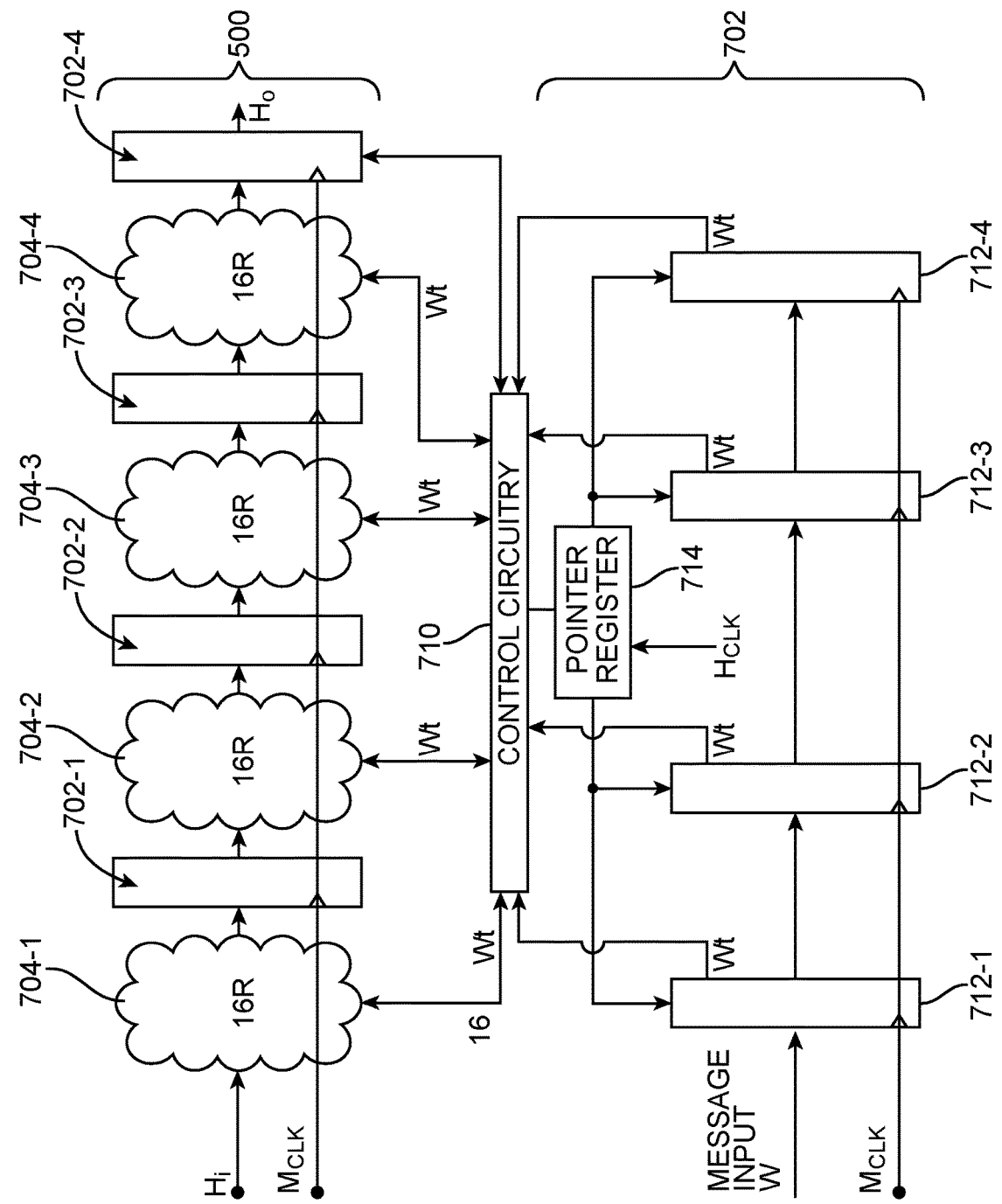
FIG. 17 is an illustrative diagram showing how hashing circuitry may be pipelined and provided with message words from message scheduling circuitry that is controlled using an array of pointers in accordance with an embodiment of the present invention.

In some scenarios, message scheduling circuitry 398 of FIG. 13 includes respective registers for each round of hashing circuitry 500. For example, message scheduling circuitry 398 of FIG. 13 may include sixteen registers 400 that each shift words to the next register. Including a respective register for each round of hashing and shifting words between the registers may consume an excessive amount of chip space on core 220. If desired, message scheduling circuitry 398 of FIG. 13 may be optimized to reduce resource and area consumption by forming message scheduling circuitry with a single register for every sixteen rounds of hashing circuitry 500. FIG. 17 is an illustrative diagram showing how optimized message scheduling circuitry may be provided for generating message words for hashing circuitry 500.

As shown in FIG. 17, hashing module 700 (e.g., first hashing module 262 of FIG. 11, second hashing module 266, etc.) may include hashing circuitry 500 having 64 rounds of hashing for implementing a SHA-256 hashing algorithm (e.g., as described in connection with FIG. 12 and/or FIG. 14) and message scheduling circuitry 702 for providing message words to hashing circuitry 500.

If desired, hashing circuitry 500 may include pipeline registers 702 interposed between every group 704 of 16 rounds (16R) of hashing circuitry 500. For example, a first pipeline register 702-1 may be interposed between a first group 704-1 of sixteen rounds (e.g., rounds 0 through 15) and a second group 704-2 of sixteen rounds (e.g., rounds 16 through 31), a second pipeline register 702-2 may be interposed between the second group of rounds 704-2 and a third group of rounds 704-3 (e.g., rounds 32-47), and a fourth pipeline register may be formed at the output of a fourth group of rounds 704-4 (e.g., rounds 48-63). The first sixteen rounds 704-1 may receive an input initial hash value $H_1$ and may process initial hash value $H_1$ based on sixteen rounds of the logic shown in FIGS. 12 and/or 14 when provided with message schedule words $W_t$ generated by message scheduling circuitry 702.

Control circuitry 710 may control the transmission of words $W_t$ to hashing circuitry 500 (e.g., circuitry 710 may interface between hashing circuitry 500 and message schedule circuitry 702). Hashing pipeline registers 702 may be clocked using clock signal Mclk and may latch the output of the preceding 16 rounds 704 at a rising edge of clock signal Mclk. This example is merely illustrative and, if desired, pipeline registers 702 may latch on a falling edge of clock Mclk or using any other desired trigger.

Sixteen words $W_t$ may be provided to each group of hashing rounds 704 per cycle of clock signal Mclk. In this way, sixteen rounds of hashing (each provided with a corresponding message word $W_t$) may be performed to generate an output that is latched onto each register 702. In other words, clock signal Mclk may control pipelines 702 so that the pipelines latch the output of the preceding sixteen hashing rounds 704 once that output has been produced. For example, first pipeline 702-1 may latch an output of rounds 704-1 and may provide the latched data as an input to rounds 704-2. Second pipeline 702-2 may latch an output of rounds 704-2 and may provide the latched data as an input to rounds 704-3. Third pipeline 702-3 may latch an output of rounds 704-3 and may provide the latched data as an input to rounds 704-4. Fourth pipeline 702-4 may latch the output of rounds 704-4 and may output that value as hash output value $H_0$ (or output value $H_F$ in second hashing module 266).

Message scheduling circuitry 702 may include control circuitry 710, message registers 712 (e.g., a first register 712-1, a second register 712-2, a third register 712-3, etc.), and a pointer register 714. First message register 712-1 may receive a message input W (e.g., from module 260 in scenarios where module 700 is first hashing module 262 or from first hashing module 262 in scenarios where module 700 is second hashing module 266 as shown in FIG. 11). Registers 712 may be clocked using clock signal Mclk (e.g., the same clock signal provided to pipeline registers 702). Registers 712 may latch their inputs when a rising edge of clock signal Mclk is received. By synchronizing registers 702 with pipeline registers 702, new words may be shifted into message registers 712 after every sixteen rounds of hashing is performed by circuitry 500. This example is merely illustrative and, if desired, registers 712 may latch data on a falling edge of clock signal Mclk or using any other trigger.

As shown in FIG. 17, first message register 712-1 may latch input W on a rising edge of clock signal Mclk. First message register 712-1 may generate and output message words $W_t$ based on the stored message W. Registers 712 may output words $W_t$ based on read and write pointers received from pointer register 714. Read and write pointers generated by pointer register 714 may read words from registers 712 and may control the shifting of words through register 712 based on the logical algorithm of message schedule 398 as shown in FIG. 13. Pointer register 714 may be clocked using a fast clock signal Hclk that has a period that is sixteen times shorter than the period of clock signal Mclk. Pointer register 714 may control registers 712 to output sixteen different words $W_t$ based on a message stored on that register for every cycle of clock signal Mclk. After one cycle of clock signal Mclk (e.g., after 16 message words $W_t$ have been output and sixteen rounds of hashing have been performed by each group of hashing rounds 704), the message stored on register 712-1 may be output and latched onto second register 712-2 and a new message may be latched and stored onto first register 712-1. This process may be continued until messages are stored on each register 712.

Each register 712 may provide sixteen message words $W_t$ for a stored message W to a corresponding group of hashing rounds 704 via control circuitry 710 (e.g., each of the sixteen message words is provided for a corresponding round of the corresponding group of rounds 704). For example, first message register 712-1 may provide sixteen different message words $W_t$ to the first group of hashing rounds 704-1 via control circuitry 710, second message register 712-2 may provide sixteen different message words $W_t$ to second group of rounds 704-2 via control circuitry 710, third message register 712-3 may provide message words $W_t$ to the third group of rounds 704-3, etc. As the message W is shifted to a new message register 712 for every sixteen rounds of hashing circuitry 500 (e.g., for every period of signal Mclk or every sixteen periods of signal Hclk), each message register 712 may provide appropriate message words $W_t$ to its corresponding rounds of hashing circuitry 500.

Figure 18:
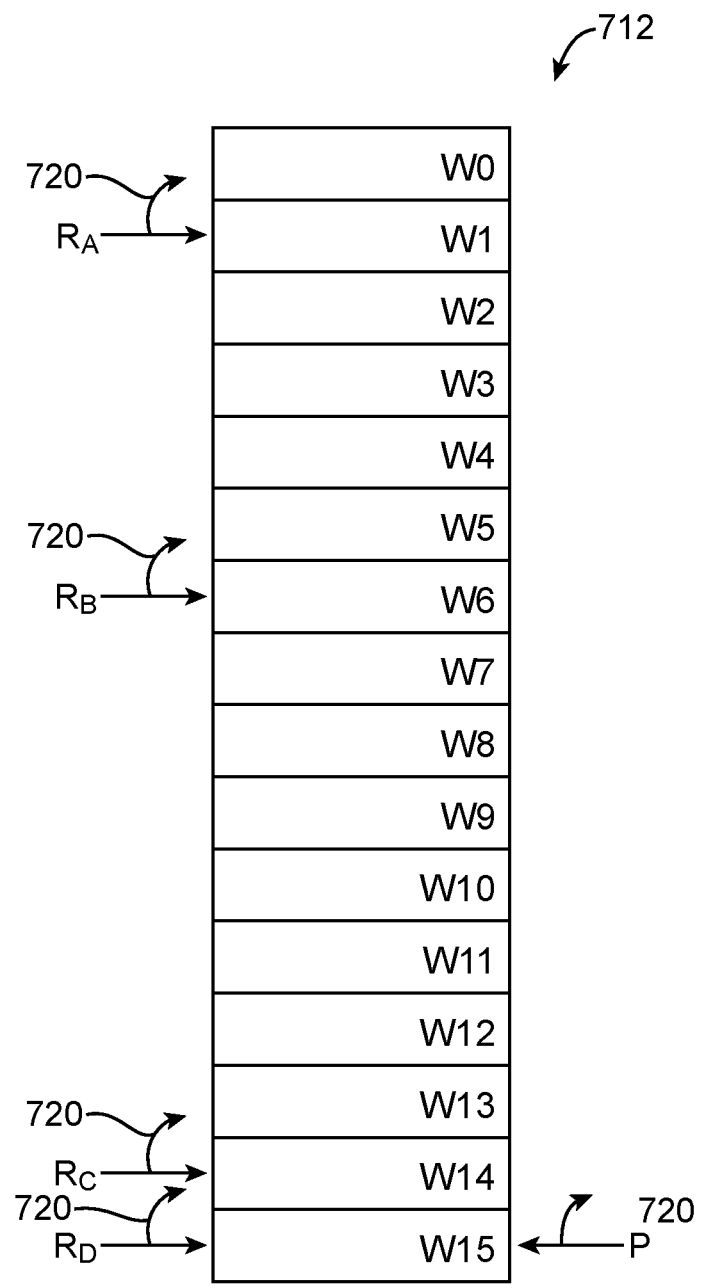
FIG. 18 is an illustrative diagram of a message scheduling register of the type shown in FIG. 17 that is controlled by an array of pointers to provide sixteen messages to a corresponding sixteen rounds of hashing circuitry before a new message is shifted into the register in accordance with an embodiment of the present invention.

FIG. 18 is an illustrative diagram showing how message register 712 may be controlled using pointers received from pointer register 714. As shown in FIG. 18, message register 712 (e.g., a given one of message registers 712-1, 712-2, etc.) may receive a pointer array from pointer register 714 that includes four read pointers $R_A$, $R_B$, $R_C$, and $R_D$ and one write pointer Pw. A message W may be initially stored on register 712 (e.g., when a rising edge of clock signal Mclk is received). Message W may be partitioned into sixteen 32-bit words W0 through W15 (e.g., word W15 may be a most significant word in the message whereas word W0 is a least significant word in the message). Each word W0 through W15 may be precomputed prior to loading onto the register.

Read pointers R received from pointer register 714 may read words from register 712 at selected locations and write pointer P received from pointer register 714 may write a word to register 712 at a selected location such that the logical algorithm of message schedule 398 shown in FIG. 13 is performed using a single register 712 and adjustment of the corresponding pointers. For example, after message W has been loaded onto register 712, read pointer $R_D$ may read word W15 (corresponding to the first word 400 from the left in FIG. 13), read pointer $R_C$ may read word W14 (corresponding to the second word 400 shown in FIG. 13), read pointer $R_B$ may read word W6 (corresponding to the tenth word 400 shown in FIG. 13), and read pointer $R_A$ may read the word W1 (corresponding to the fifteenth word 400 shown in FIG. 13). Read word W15 may be provided to logic circuit 406 as shown in FIG. 13 and the output of logic circuit 406 may be combined with read word W15 using the first adder circuit 402. Read word W6 and the output of first adder circuit 402 may be combined at second adder circuit 402. Read word W1 may be provided to logic 406 and the output of logic 406 may be combined with the output of the second adder circuit at third adder circuit 402.

After each of the values have been read and combined based on the logic of FIG. 13, each read pointer R and the write pointer P may be shifted up by one word. For example, read pointer $R_A$ increments to word W0, read pointer $R_B$ increments to word W5, read pointer $R_C$ increments to word W13, read pointer $R_D$ increments to word W14, and write pointer P increments to word W14 as shown by arrows 720. After the pointers have been shifted, the newly computed word (e.g., as computed based on the words read by read pointers R prior to shifting and using the logic shown in FIG. 13) may be written at the location of write pointer P. In this way, the message scheduling algorithm of FIG. 13 may be performed using a single register and shifting read and write pointers provided to the register, instead of by forming sixteen separate registers 400 and shifting values between the registers, thereby saving valuable chip area on core 220 relative to scenarios where sixteen separate registers are formed.

Pointers R and P may be incremented through register 712 at a frequency that is sixteen times the frequency of clock signal Mclk (e.g., because clock signal Hclk has a frequency that is sixteen times greater than signal Mclk) so that sixteen words are provided to a corresponding group of sixteen rounds 704 of hashing circuitry 500. After sixteen words have been read from register 712, the pointers may overflow register 712, a rising edge of message clock Mclk may be received, the message W written on register 712 may be shifted to the subsequent message register 712, and a new message W may be written onto register 712. Register 712 may subsequently provide message words $W_t$ for the newly stored message to its corresponding group of hashing rounds 704.

Figure 19:
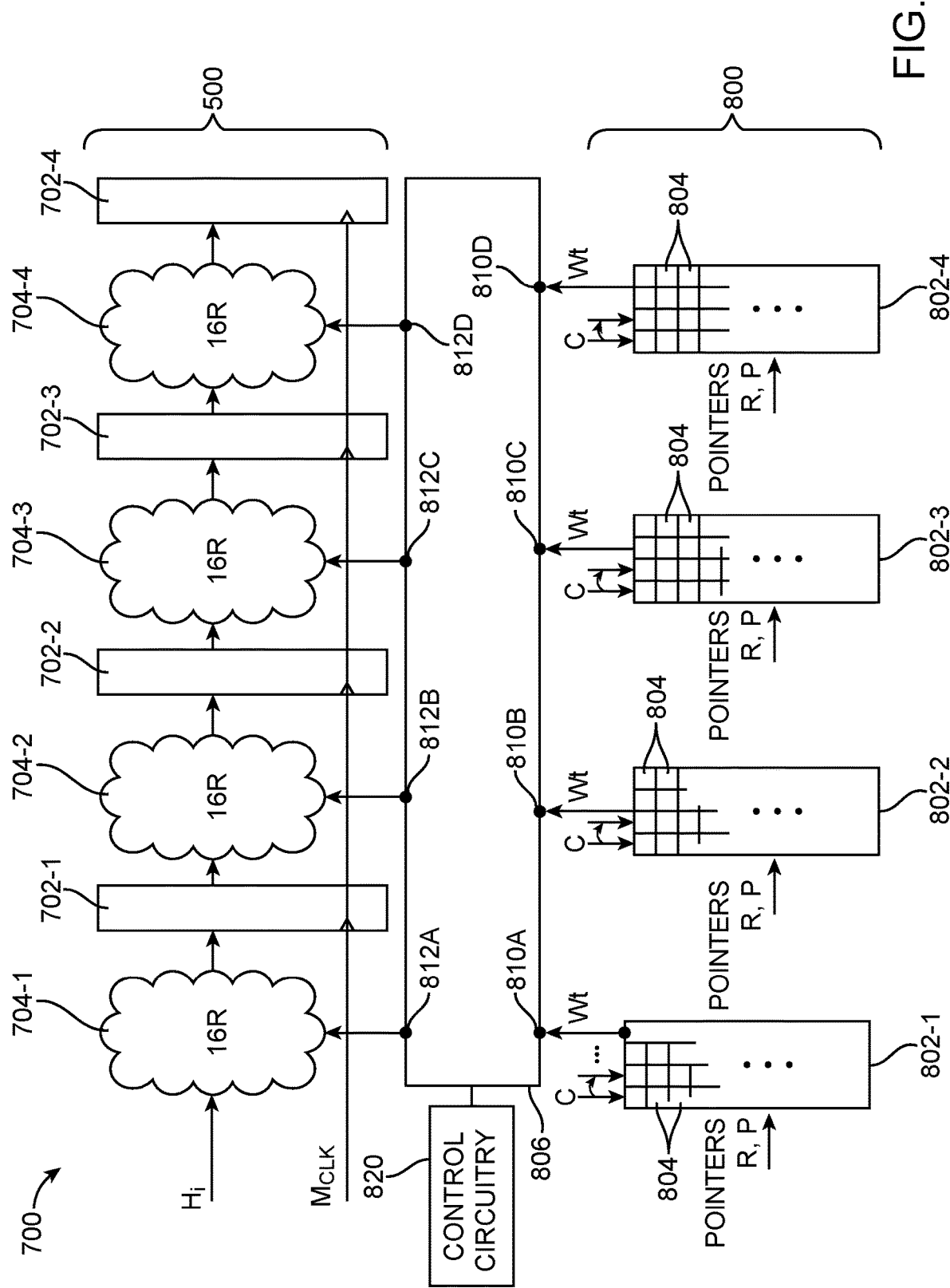
FIG. 19 is an illustrative diagram showing how message scheduling circuitry may be formed from multiple banks of memory elements controlled using row and column pointers for providing message words to a selected group of sixteen rounds of hashing circuitry in accordance with an embodiment of the present invention.

In practice, shifting messages W between message registers 712 may require excessive processing resources. If desired, message scheduling circuitry 700 may be implemented using a memory array such as a random access memory (RAM) array or other memory unit instead of using a dispersed register bank of the type shown in FIGS. 16 and 17 to eliminate the need to shift messages W between message registers 712. FIG. 19 is an illustrative diagram showing how message scheduling circuitry 700 may be implemented using memory (e.g., static or dynamic random-access-memory (RAM)).

As shown in FIG. 19, hashing module 700 may include message scheduling circuitry 800 formed from one or more arrays of memory elements 802 (e.g., a first RAM array 802-1, a second RAM array 802-2, a third RAM array 802-3, and a fourth RAM array 802-4). Arrays 802 may include any desired type of memory such as static random access memory (SRAM). Each array 802 may include a number of memory cells 804 arranged in rows and columns. Each memory cell 804 may store a corresponding 32-bit word. Each column of memory cells 804 in an array 802 may include a corresponding message W (where each row represents a 32-bit word in that message). In this way, multiple messages may be precomputed and stored onto each array 802. Arrays 802 may be coupled to hashing circuitry 500 via switching circuitry 806 (e.g., a switching matrix or switching fabric).

Arrays 802 may receive column pointers C from pointer register 714 (not shown) that select (activate) a single one of the columns of array 802 at a given time (e.g., that activate a single one of the stored words at a given time). Read pointers R and write pointers P received from pointer register 714 may read and write the words of the selected column to implement the message scheduling algorithm of FIG. 13 (e.g., similar to as described in connection with FIG. 18) such that sixteen words $W_t$ are output by each register for each column. After sixteen rounds of hashing have been performed (e.g., after sixteen words have been read), pointer register 714 may shift column pointer C to the next column in array 802 to activate the message W stored in that column. This message may then be used to generate corresponding words $W_t$ (based on pointers R and P) to be provided to hashing circuitry 500. If desired, each column of array 802 may include a message for generating words for a particular group of hashing rounds 704. For example, the first column of array 704 may be used to provide words for first group of hashing rounds 704-1, the second column of array 704 may be used to provide words for second group of hashing rounds 704-2, etc. Column pointer C may be shifted to select the column of array 802 corresponding to a given one of the groups of hashing rounds 704 for providing message words to that group of hashing rounds.

Words $W_t$ may be routed by switching circuitry 806 to a corresponding group of hashing rounds 704 (e.g., such that each array 802 provides words $W_t$ to a single corresponding group of hashing rounds 704 at a given time). Switching circuitry 806 may have a first group of ports 812 each coupled to a corresponding group of hashing rounds 704 and a second group of ports 810 each coupled to a corresponding one of message memory arrays 802. Control circuitry 820 may provide control signals that place switching circuitry 806 into a desired configuration for routing words $W_t$ between any desired arrays 802 and any desired hashing groups 704. For example, circuitry 820 may control switching circuitry 806 to pass words from the first column of array 802-1 when column pointer C is pointing to the first column of array 802-1, may control circuitry 806 to pass words from the second column of array 802-1 when column pointer C is pointing to the second column of array 802-1, may control circuitry 806 to pass words from the third column of array 802-1 when column pointer C is pointing to the third column of array 802-1, etc. Switching circuitry 806 may concurrently route message words from second, third, and fourth arrays 802-2, 802-3, and 802-4 to corresponding groups of hashing rounds 704 (e.g., groups of hashing rounds 704 that are not receiving message words from first array 802-1).

For example, control circuitry 820 may place switching circuitry 806 in a first configuration in which port 812A is coupled to port 810A, port 812B is coupled to port 810B, port 812C is coupled to port 810C, and port 812D is coupled to port 810D so that first array 802-1 provides words $W_t$ to first group of hashing rounds 704-1, second array 802-2 provides words $W_t$ to second group of hashing rounds 704-2, third array 802-3 provides words $W_t$ to third group of hashing rounds 704-3, and fourth array 802-4 provides words $W_t$ to fourth group of hashing rounds 704-4 (e.g., while the first column of each array 802 is selected using column pointers C). As another example, control circuitry 820 may place switching circuitry 806 in a second configuration in which port 810A is coupled to port 812B, port 810B is coupled to port 812C, port 810C is coupled to port 812D, and port 810D is coupled to port 812A so that first array 802-1 provides words to second group of hashing rounds 704-2, second array 802-2 provides words to third group of hashing rounds 704-3, third array 802-3 provides words to fourth group of hashing rounds 704-4, and fourth array 802-4 provides words to first group of hashing rounds 704-1 (e.g., while the second column in each array 802 is selected using column pointers C). The second configuration of switching circuitry 806 may, for example, be used after sixteen rounds of hashing have been performed using the first configuration of switching circuitry 806 (e.g., after one period of clock signal Mclk while in the first configuration), so that hash values continue to be passed through pipeline registers 702 of hashing circuitry 500.

Similarly, control circuitry 820 may place switching circuitry 806 in a third configuration subsequent to the second configuration (e.g., after one period of clock signal Mclk in the second configuration) in which port 810A is coupled to port 812C, port 810B is coupled to port 812D, port 810C is coupled to port 812A, and port 810D is coupled to port 812B so that first array 802-1 provides words to third group of hashing rounds 704-3, second array 802-2 provides words to fourth group of hashing rounds 704-4, third array 802-3 provides words to first group of hashing rounds 704-1, and fourth array 802-4 provides words to second group of hashing rounds 704-2 (e.g., while the third column in each array 802 is selected using column pointers C). Control circuitry 820 may subsequently place switching circuitry 806 in a fourth configuration in which port 810A is coupled to port 812D, port 810B is coupled to port 812A, port 810C is coupled to port 812B, and port 810D is coupled to port 812C so that first array 802-1 provides words to fourth group of hashing rounds 704-4, second array 802-2 provides words to first group of hashing rounds 704-1, third array 802-3 provides words to second group of hashing rounds 704-3, and fourth array 802-4 provides words to third group of hashing rounds 704-3 (e.g., while the fourth column in each array 802 is selected using column pointers C). Control circuitry 820 may subsequently place switching circuitry 806 back into the first configuration. In this way, each one of arrays 802 may provide message words based on four stored messages to each of the pipelined groups of hashing rounds 704 and each one of the arrays 802 may provide words to a corresponding group 704 concurrently as hash values are passed through pipeline 500 (e.g., message words may be provided to hashing circuitry 500 as a two dimensional memory lookup instead of as an output of a chain of registers).

The example of FIGS. 17 and 18 are merely illustrative. If desired, arrays 802 may be formed as a single array (e.g., having sixteen rows and columns) that provides words to each group of hashing rounds concurrently or as any desired number of arrays. Messages may be stored in columns of array 802 in any desired order (e.g., a message for first hashing group 704-1 may be formed in the first column, second column, third column, or fourth column of array 802, a message for second hashing group 704-2 may be formed in the first column, second column, third column, or fourth column, etc.). Hashing circuitry 500 may be partitioned into groups of hashing rounds of any desired size (e.g., any desired number of pipeline registers 702 may be formed) such as groups of eight rounds, thirty-two rounds, four rounds, etc. The frequency of clocks Mclk and Hclk may be adjusted to accommodate any changes to the number of rounds in each pipelined group 704 (e.g., clock Hclk may have a period that is ⅛ that of clock Mclk in scenarios where each group 704 includes eight hashing rounds). In general, any desired array 802 may be coupled to any corresponding group of hashing rounds 704 using switching circuitry 806 in any desired order.

In this way, messages words may be provided by shifting pointers coupled to memory arrays instead of shifting messages W between registers as in the arrangement of FIG. 17 and instead of shifting words between multiple registers 400 as shown in FIG. 13. By reducing the number of required message and word shifts, power and resource consumption by the message scheduling circuitry may be reduced. If desired, the message scheduling arrangements of FIGS. 17 and 19 may be combined with the diagonal hashing circuitry of FIG. 14 or with any other desired hashing scheme. For example, hashing rounds 704 of FIGS. 17 and 19 may include only registers A and E for each round and registers 702 may record hash values B-D and F-H based on stored hash values in registers A and E of previous rounds of hashing. If desired, message scheduling circuitry 712 and/or 802 may be operated using a diagonal messaging scheme (e.g., similar to the diagonal hashing scheme of FIG. 14).

The foregoing is merely illustrative of the principles of this invention and various modifications can be made by those skilled in the art without departing from the scope and spirit of the invention. The foregoing embodiments may be implemented individually or in any combination.

We claim:

1. An electronic device for computing SHA-256 values, the electronic device comprising:
   communications circuitry;
   processing circuitry;
   storage circuitry; and
   hashing circuitry comprising:
      sixty-four sequential rounds of SHA-256 circuitry, wherein each round of the sixty-four sequential rounds of SHA-256 circuitry (i) comprises an A register for storing SHA-256 A values and an E register for storing SHA-256 E values and (ii) does not comprise any other variable registers for storing SHA-256 B, C, D, F, G, or H values, and
      logic circuitry that, when activated, controls the hashing circuitry to:
         store values in each A register and E register of the sixty-four rounds of SHA-256 circuitry, and
         output a final SHA-256 result comprising SHA-256 A, B, C, D, E, F, G and H values by reading each of the SHA-256 A, B, C, D, E, F, G and H values from one of the A or E registers of the sixty-four rounds of SHA-256 circuitry, wherein the storage circuitry comprises instructions that, when executed by the processing circuitry, control the processing circuitry to:
    generate data by using the final SHA-256 result, and
    store the generated data at a peer-to-peer network by using the communications circuitry.

2. The electronic device of claim 1, wherein the SHA-256 A value of the final SHA-256 result is the value stored in the A register of the 64th round of SHA-256 circuitry.

3. The electronic device of claim 2, wherein the SHA-256 E value of the final SHA-256 result is the value stored in the E register of the 64th round of SHA-256 circuitry.

4. The electronic device of claim 1, further comprising difficulty comparison circuitry that, when activated, compares the final SHA-256 result to a predetermined difficulty value in accordance with a protocol, wherein the processing circuitry generates the data by using the final SHA-256 result in response to a determination that the final SHA-256 result satisfies the predetermined difficulty value.

5. The electronic device of claim 1, further comprising:
    a plurality of message registers comprising at least one message, each message including a plurality of message words, and
    control circuitry that, when activated, selectively routes the plurality of message words from the message registers to the sixty-four rounds of SHA-256 circuitry,
    wherein the hashing circuitry further comprises: pipeline registers interposed between one or more rounds of SHA-256 circuitry, and
    wherein each of the message registers stores message words for a respective group of rounds of SHA-256 circuitry.

6. The electronic device of claim 5, further comprising a pointer register comprising at least one pointer array that includes at least one pointer for controlling at least one of the plurality of message registers.

7. The electronic device of claim 6, wherein at least one pointer array of the pointer register comprises at least one read pointer and at least one write pointer for at least one message register, wherein each read pointer points to a message word stored by the respective message register, and each write pointer points to a message word stored by the respective message register.

8. The electronic device of claim 7, wherein the control circuitry selectively routes the plurality of message words from the message registers to the sixty-four rounds of SHA-256 circuitry by using the read pointers stored by the pointer register.

9. The electronic device of claim 8,
    wherein the hashing circuitry comprises pipeline registers interposed between every sixteen rounds SHA-256 circuitry,
    wherein the electronic device comprises one message register for each group of sixteen rounds of SHA-256 circuitry, and
    wherein each message register comprises one message that includes sixteen message words.

10. The electronic device of claim 9, wherein the control circuitry is constructed to perform message scheduling for a message by shifting read and write pointers provided for the message register associated with the message.

11. The electronic device of claim 10, wherein each message is a 512-bit message and each message word is a 32-bit message word.

12. The electronic device of claim 11, wherein each pipeline register and message register are clocked using a clock signal having a common first frequency.

13. The electronic device of claim 12, wherein the pointer register is clocked using a clock signal having second frequency that is different from the first frequency.

14. An electronic device comprising:
    communications circuitry;
    processing circuitry;
    storage circuitry; and
    hashing circuitry comprising:
        sixty-four sequential rounds of SHA-256 circuitry, wherein each round of the sixty-four sequential rounds of SHA-256 circuitry comprises (i) an A register for storing SHA-256 A values and an E register for storing SHA-256 E values and (ii) does not comprise any other variable registers for storing SHA-256 B, C, D, F, G, or H values, and
        logic circuitry that, when activated, controls the hashing circuitry to:
            store values in each A register and E register of the sixty-four rounds of SHA-256 circuitry, and
            output a final SHA-256 result comprising SHA-256 A, B, C, D, E, F, G and H values by reading each of the SHA-256 A, B, C, D, E, F, G and H values from one of the A or E registers of the sixty-four rounds of SHA-256 circuitry, wherein the final SHA-256 result comprises SHA-256 A, B, C, D, E, F, G and H values, wherein the SHA-256 A value of the final SHA-256 result is the value stored in the A register of the 64th round of SHA-256 circuitry, the SHA-256 E value of the final SHA-256 result is the value stored in the E register of the 64th round of SHA-256 circuitry, and the SHA-256 B value of the final SHA-256 result is the value stored in the A register of the 63rd round of SHA-256 circuitry,
    wherein the storage circuitry comprises instructions that, when executed by the processing circuitry, control the processing circuitry to:
        generate data by using the final SHA-256 result, and
        store the data at a peer-to-peer network by using the communications circuitry.

15. The electronic device of claim 14, wherein the SHA-256 C value of the final SHA-256 result is the value stored in the A register of the 62nd round of SHA-256 circuitry.

16. The electronic device of claim 15, wherein the SHA-256 D value of the final SHA-256 result is the value stored in the A register of the 61st round of SHA-256 circuitry.

17. The electronic device of claim 16, wherein the SHA-256 F value of the final SHA-256 result is the value stored in the E register of the 63rd round of SHA-256 circuitry.

18. The electronic device of claim 17, wherein the SHA-256 G value of the final SHA-256 result is the value stored in the E register of the 62nd round of SHA-256 circuitry.

19. The electronic device of claim 18, wherein the SHA-256 H value of the final SHA-256 result is the value stored in the E register of the 61st round of SHA-256 circuitry.

20. An electronic device comprising:
    communications circuitry;
    processing circuitry;
    storage circuitry;
    hashing circuitry comprising:
        sixty-four sequential rounds of SHA-256 circuitry, wherein each round of the sixty-four sequential rounds of SHA-256 circuitry comprises (i) an A register for storing SHA-256 A values and an E register for storing SHA-256 E values and (ii) does not comprise any other variable registers for storing SHA-256 B, C, D, F, G, or H values, and logic circuitry that, when activated, controls the hashing circuitry to:
store values in each A register and E register of the sixty-four rounds of SHA-256 circuitry, and
output a final SHA-256 result comprising SHA-256 A, B, C, D, E, F, G and H values by reading each of the SHA-256 A, B, C, D, E, F, G and H values from one of the A or E registers of the sixty-four rounds of SHA-256 circuitry,
a plurality of message registers comprising at least one message, each message including a plurality of message words; and
control circuitry that, when activated, selectively routes the plurality of message words from the message registers to the sixty-four rounds of SHA-256 circuitry,
wherein the logic circuitry, when activated, controls the hashing circuitry to store values in each A register and E register of the sixty-four rounds of SHA-256 circuitry based on the plurality of message words routed to the sixty-four rounds of SHA-256 circuitry, and
wherein the storage circuitry comprises instructions that, when executed by the processing circuitry, control the processing circuitry to:
generate data by using the final SHA-256 result, and
store the data at a peer-to-peer network by using the communications circuitry.

* * * * *